United States Patent [19]

Miyagaki et al.

[11] Patent Number: 4,942,514

[45] Date of Patent: Jul. 17, 1990

[54] PROCESS MONITORING AND CONTROL SYSTEM AND METHOD OF PROCESS MONITORING AND CONTROL

[75] Inventors: Hisanori Miyagaki, Hitachiota; Katsuhito Shimizu; Haruya Tobita, both of Hitachi; Atsushi Takita, Mito; Tooru Kimura, Hitachi; Akira Sugano, Katsuta; Masayuki Kikuchi, Hitachiota; Masayuki Fukai, Hitachi, all of Japan

[73] Assignee: Hitachi, Ltd., Tokyo, Japan

[21] Appl. No.: 268,714

[22] Filed: Nov. 9, 1988

[30] Foreign Application Priority Data

Nov. 17, 1987 [JP] Japan .................. 62-288409
Feb. 17, 1988 [JP] Japan .................. 63-32770

[51] Int. Cl.⁵ .............................................. G06F 3/14
[52] U.S. Cl. ...................................... 364/190; 340/734
[58] Field of Search ........................... 364/188–191; 340/734

[56] References Cited

U.S. PATENT DOCUMENTS

| 4,079,450 | 4/1978 | Grimm et al. | 364/200 |
| 4,396,977 | 8/1983 | Slater et al. | 364/188 |
| 4,413,314 | 11/1983 | Slater et al. | 364/188 |
| 4,587,630 | 5/1986 | Straton et al. | 364/900 |
| 4,727,473 | 2/1988 | Anderson et al. | 364/188 |
| 4,821,030 | 4/1989 | Batson et al. | 340/734 |
| 4,823,283 | 4/1989 | Diehm et al. | 364/141 |
| 4,847,775 | 7/1989 | Roch et al. | 364/190 |

FOREIGN PATENT DOCUMENTS

| 0025987 | 3/1975 | Japan . |
| 0152011 | 9/1982 | Japan . |
| 0054017 | 3/1985 | Japan . |
| 0054018 | 3/1985 | Japan . |
| 0054019 | 3/1985 | Japan . |
| 0226801 | 10/1986 | Japan . |

Primary Examiner—Allen MacDonald
Attorney, Agent, or Firm—Antonelli, Terry, Stout & Kraus

[57] ABSTRACT

A system and a method of monitoring and displaying in which control screen indicating a control data of a control device for process control displayed on the display screen of a display unit by a touch operation on a diagram of the control device, the control data being further selected by another touch operation. The display condition of the control data display area thus changes, the operator being permitted to visually check whether the operation has been selected correctly. After visual confirmation, a switch disposed outside of the display screen and corresponding to the called control screen is operated to start the operation of the control device determined for control for the first time at this time point. In case of a combined display of a control device and a control screen, on the other hand, a first display unit is utilized such that the called control screen is displayed at a position far from the control device to be controlled, thereby not hiding the control device display. The control screen may be moved to a given position on the system diagram. A second display unit is utilized such that the original system diagram is displayed in a reduced form in combination with and not superimposed on the called control screen. The control screen and the control-related screen are called repeatedly so that when the reduction rate of the original system diagram exceeds a critical value, the reduction rate is fixed to a predetermined value and the control screens are displayed in scroll.

43 Claims, 23 Drawing Sheets

FIG. IB  SYSTEM DIAGRAM METHOD
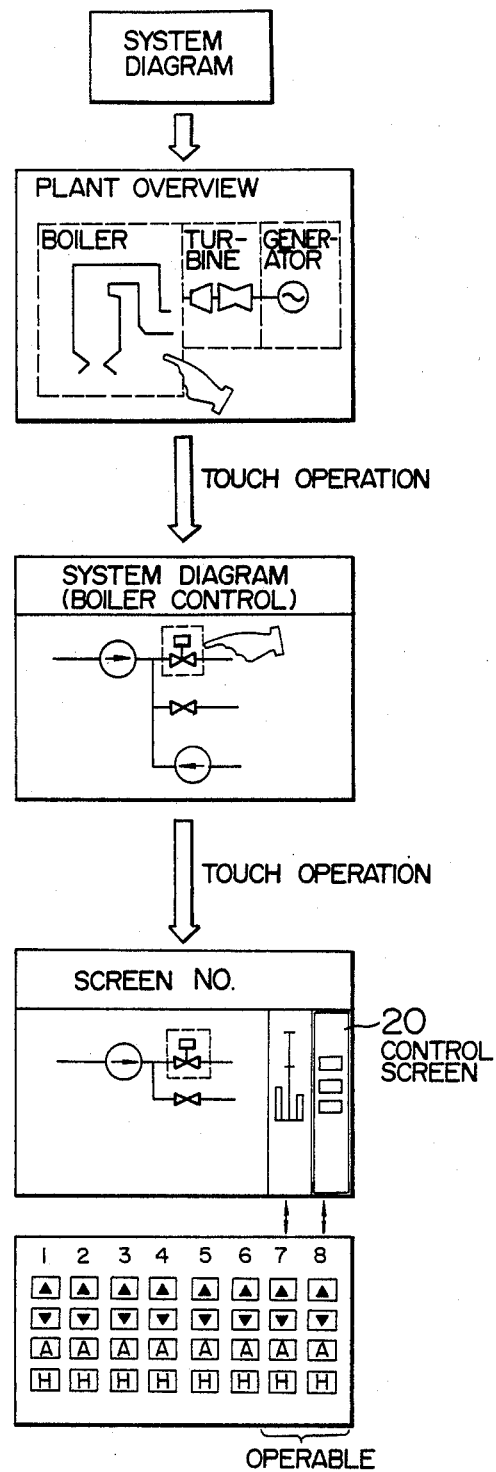

FIG. 6

TABLE I

| SCREEN NO. | I | | II | |
|---|---|---|---|---|
| FRAME (1) | $XL_{11}$ | $XR_{11}$ | $XL_{21}$ | $XR_{21}$ |
| FRAME (2) | $XL_{12}$ | $XR_{12}$ | $XL_{22}$ | $XR_{22}$ |
| ⋮ | ⋮ | ⋮ | | |
| FRAME (8) | | | | |

TABLE II

| | FRAME (1) | | | FRAME (2) | |
|---|---|---|---|---|---|
| BUTTON i | $YL_{11}$ | $YU_{11}$ | BUTTON i | $YL_{21}$ | $YU_{21}$ |
| BUTTON ii | $YL_{12}$ | $YU_{12}$ | BUTTON ii | $YL_{22}$ | $YU_{22}$ |
| BUTTON iii | $YL_{13}$ | $YU_{13}$ | BUTTON iii | $YL_{23}$ | $YU_{23}$ |
| ⋮ | ⋮ | ⋮ | ⋮ | ⋮ | ⋮ |

TABLE III

| | FRAME (1) | | FRAME (2) |
|---|---|---|---|
| BUTTON i | FUNCTION CODE (OPEN) | BUTTON i | FUNCTION CODE (OPEN) |
| BUTTON ii | FUNCTION CODE (CLOSE) | BUTTON ii | FUNCTION CODE (CLOSE) |
| BUTTON iii | FUNCTION CODE (HOLD) | BUTTON iii | FUNCTION CODE (HOLD) |
| ⋮ | ⋮ | ⋮ | ⋮ |

FIG. 8A
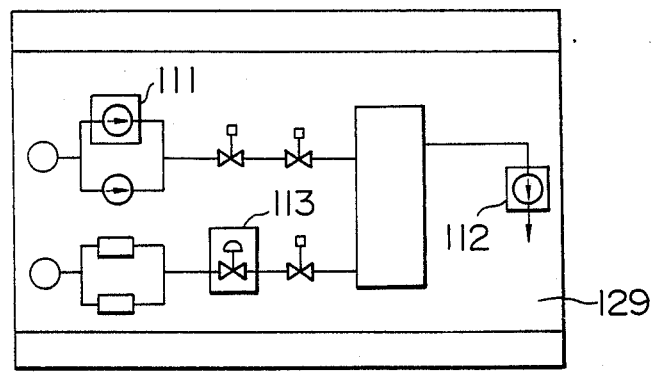
TOUCH
FIG. 8B
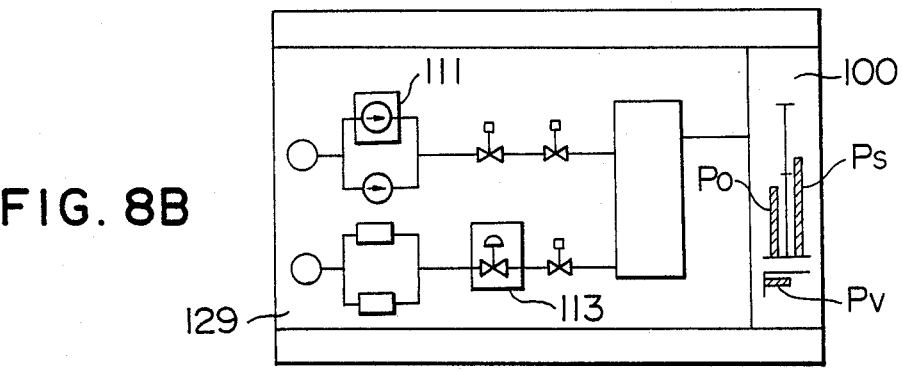
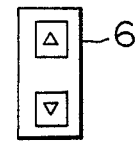

FIG. 9A
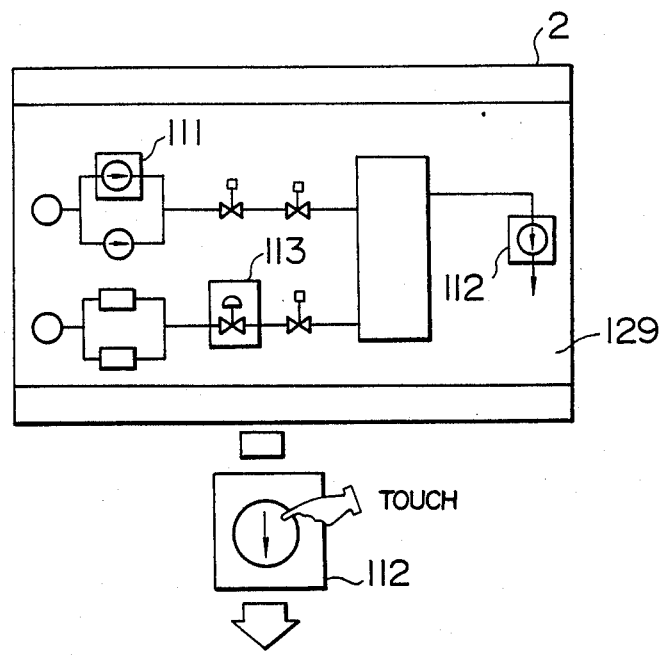
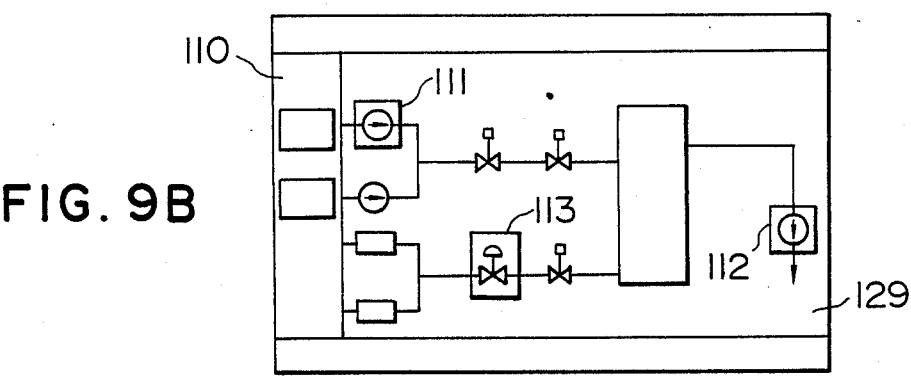
FIG. 9B
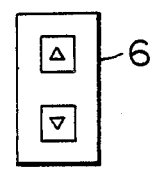

PROCESS MONITORING AND CONTROL SYSTEM AND METHOD OF PROCESS MONITORING AND CONTROL

BACKGROUND OF THE INVENTION

The present invention relates to a process monitor control system, and more particularly to a process monitor control system suitable for the control operation of a plant control device and monitoring of the operating condition of the control device.

A method of controlling and operating a process control device by use of a display unit with a touch sensor and a computer is disclosed in JP-A-60-54017, filed Sept. 2, 1983 by Tokyo Shibaura Electric Co., Ltd., JP-A-60-54018, filed Sept. 2, 1988 by Tokyo Shibaura Electric Co., Ltd. and JP-A-61-226801 filed Mar. 30, 1985 by Tokyo Shibaura Electric Co., Ltd. In the method of plant control disclosed in these patent specifications, a signal from a touch sensor or a touch screen is applied to a computer, and the result of the processing of the signal is used to send a control signal to a process control device.

On the other hand, a display unit is disclosed in JP-A-60-54019, filed Sept. 5, 1983 by Hitachi Ltd., JP-A-57-152011 filed Mar. 13, 1981 by Hokushin Electric Works, Ltd. and JP-A-50-25987 filed July 11, 1973 by Yokogawa Electric Works, Ltd. As disclosed in these patent specifications, a control screen for indicating the control data of a control device involved is displayed in combination on a screen indicating a specific pattern of the control device.

In the system of the related art mentioned above, a control device is actuated in immediate response to a single control command yet no means is incorporated for preventing a faulty operation. In the case where the touch screen is touched in error or where the control of the touch screen is faulty, an erroneous control signal may be undesirably issued to the plant. This system also lacks the consideration of parallel operation of a plurality of control devices, which are instead operable only one by one in series.

Further, a control screen indicating the control data is displayed in superimposed relations with a control device on the display screen at the time of giving an instruction. The operator, desiring to operate a control device hidden behind the control screen, is required to take the trouble of restoring the screen indicating the control device alone and then touch the control device to call the control screen for the particular control device.

SUMMARY OF THE INVENTION

The object of the present invention is to provide a process monitor control system which is both safe and easy to operate.

Specifically, an erroneous control signal is prevented from being applied to a process control device by a faulty operation or error controller on the one hand, and the content of operation or control data at a control device and the operating condition of the control device are displayed in combination in a manner so as not to hide the control device on a display screen important for operation.

In order to achieve the aforementioned object, there is provided according to the present invention a computer system comprising (1) a display unit with a touch sensor, (2) a control screen including a display screen for indicating the control data independently of or in combination with a related control device, which control screen is defined by a small frame and adapted to display the control data and/or the operating conditions of a related control device (a set numeral is displayed at the same time in the case of a control device requiring numerical setting), (3) a plurality of starting pushbuttons arranged side by side with the keyboard in front of the display unit which is operable in a manner corresponding to each control screen for starting the operation of the control device, and (4) means for selecting a control device by touch operation to display a control screen on the display screen, selecting the control data on the control screen by touch operation, confirming that the control data has been correctly selected, and pressing the starting pushbotton corresponding to the particular control screen thereby to produce a control signal for the first time at the control device, whereby the control device is actuated while the operating condition of the particular control device is displayed on the control screen at the same time.

In a plant monitoring and control system configured as mentioned above, the operator selects the control data on a control screen, and after confirming that the selection is correct, presses a pushbotton for starting the operation of a control device thereby to start the operation of the control device. Since the control device is actuated only after the start button is pressed, it is possible to prevent various inconveniences including the careless touch of the touch screen, erroneous selection of the control data or an error of the control unit of the touch screen which otherwise might cause the undesired actuation of a control device often leading to an unexpected result. Further, a plurality of control screens may be displayed for a plurality of control devices, respectively, and the control data for the control devices may be selected on the control screens and start buttons associated with the control screens pressed, thereby making it possible to transmit control signals to a plurality of control devices, respectively, for parallel operation thereof.

Furthermore, with respect to display, if the control screen of an intended control device is to be displayed, the control screen is displayed in combination on the display screen for the control device in a manner not hiding the control device, and therefore an operating instruction is issued very smoothly to each control device.

BRIEF DESCRIPTION OF THE DRAWINGS

FIGS. 1A and 1B are diagrams for explaining a method of calling a control screen.

FIG. 6 is a diagram showing a control screen data table 103 according to an embodiment of the present invention.

FIGS. 8A and 8B show examples of display on a control screen.

FIGS. 9A and 9B also show examples of display on a control screen.

DESCRIPTION OF THE PREFERRED EMBODIMENTS

Figure 1A:
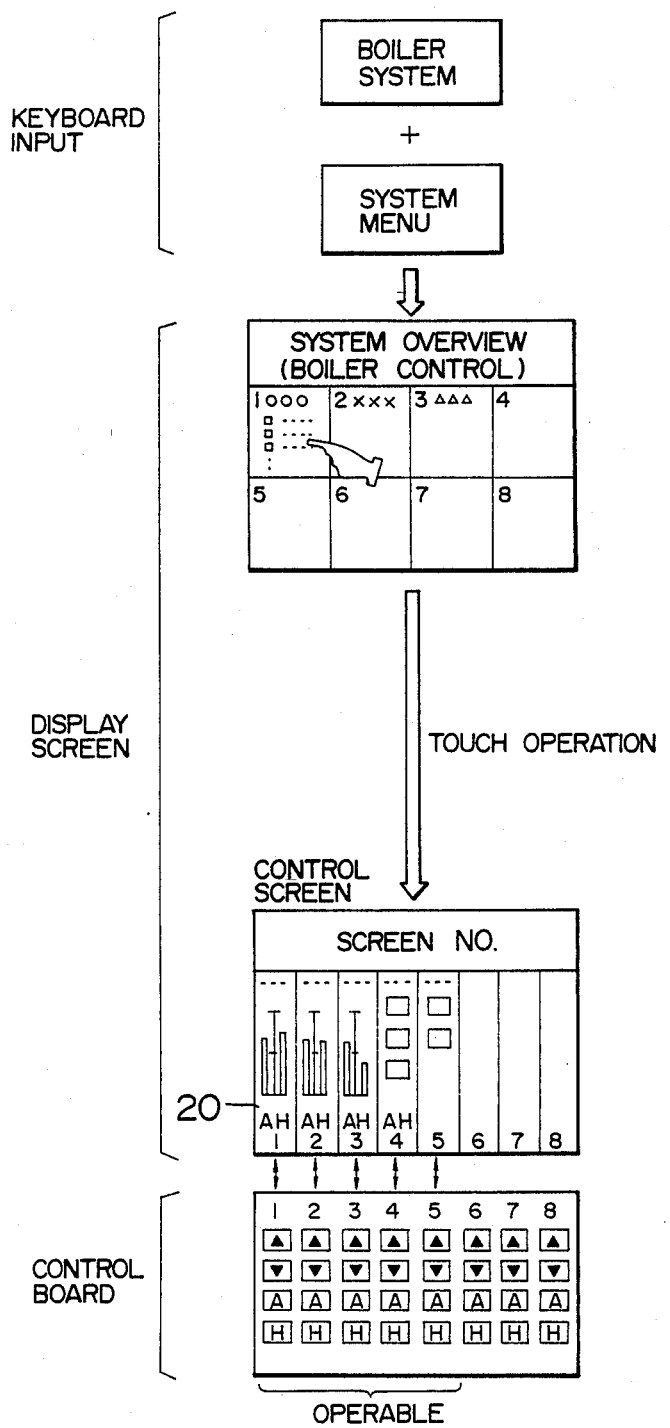

An embodiment of the present invention will be explained with reference to FIGS. 1A and 1B showing a system for calling a control screen 20. Either a system menu or a system diagram may be selected according to this embodiment. In the case of the system menu method, upon selection of a system name to be controlled by way of keyboard, the system is selected and after the system menu selection, an overview of the system is displayed.

According to the present embodiment, each system is divided into eight groups each including a maximum of eight control devices. A control device is a controller having specific functions of a valve, pump, etc. When the group area to be operated on the overview is touched, a control screen surrounded by frame for each control device is displayed together with the name or number of the control device belonging to the group, the control data and the operating conditions of the control device.

In the case of the system diagram method, a plant system diagram with typical pictures is displayed as an overview by the selection of the system diagram method key on the keyboard. Upon touch of an intended system block of the plant overview on the display as a typical picture for each system block, the system diagram of the particular block is displayed in the form of a control device as a functional unit of more specific control. When a control device intended for operation is touched, a control screen is displayed in a frame for each control device selected by touch, indicating the control data and the operating conditions of the particular control device toward the edge of the display screen.

Figure 2:
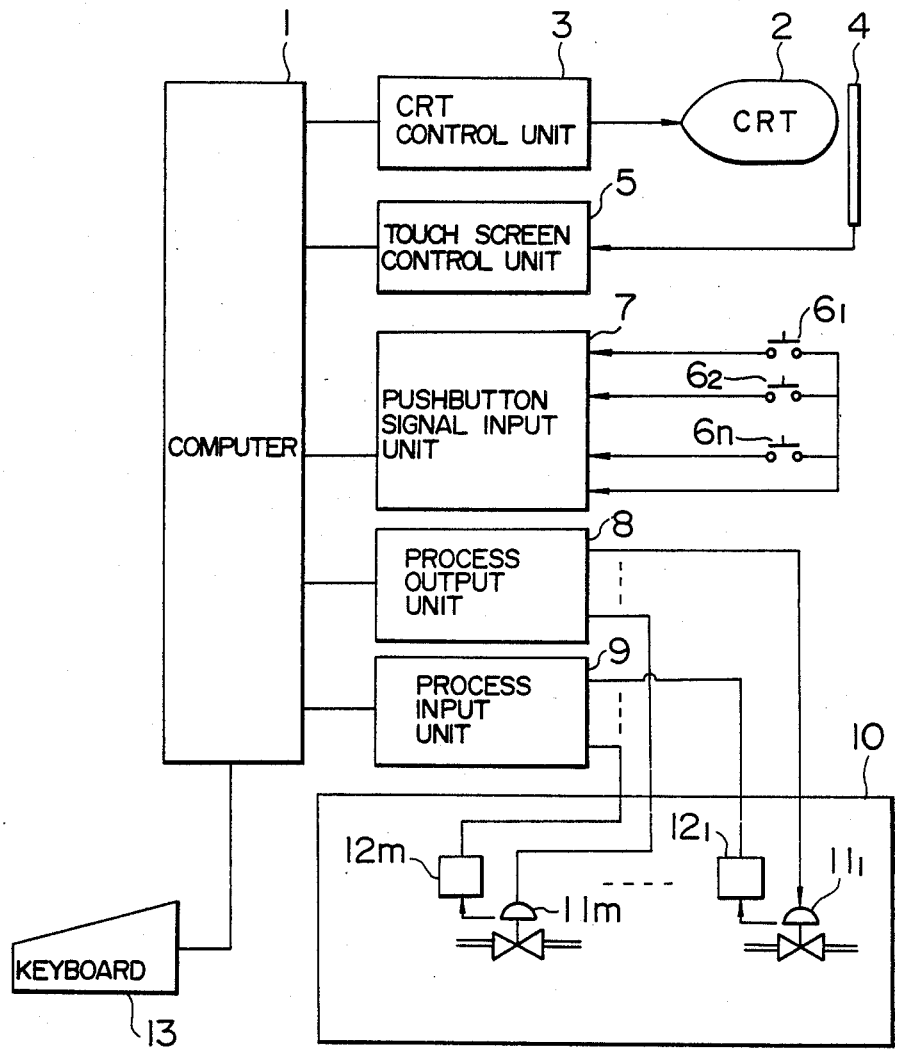
FIG. 2 is a block diagram showing a configuration of the present invention.

A general configuration of the present invention is shown in the block diagram of FIG. 2.

Figure 3A:
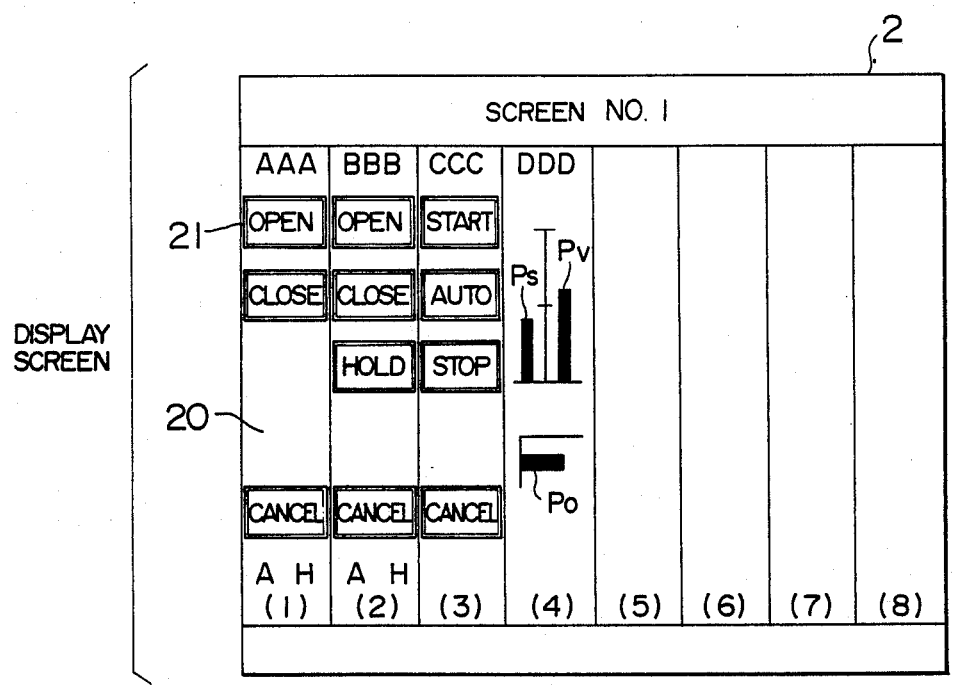
FIGS. 3A and 3B are diagrams for explaining a method of operation of the control screens and pushbottons.
Figure 3B:
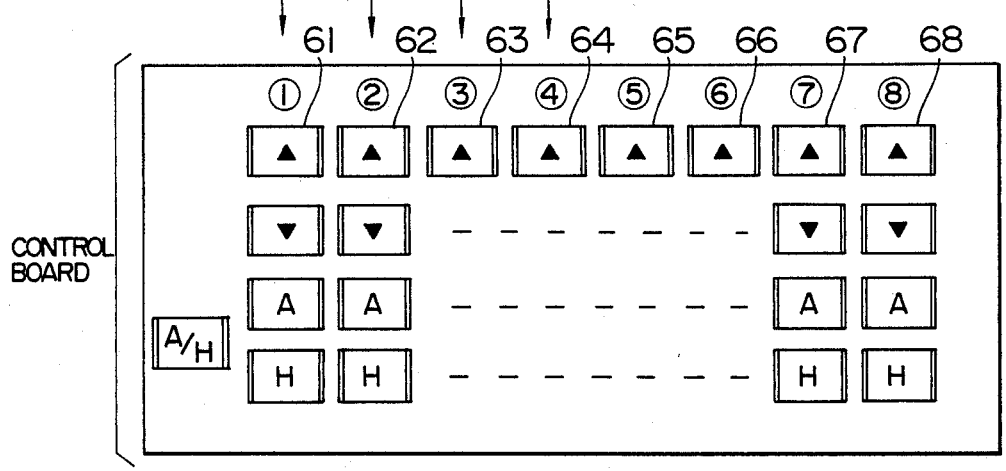

In FIG. 2, reference numeral 1 designates a computer, numeral 2 a CRT display unit, numeral 3 a CRT control unit, numeral 4 a touch screen, numeral 5 a touch screen control unit, numerals $6_1$ to $6_n$ pushbuttons, numeral 7 a pushbotton signal input unit, numeral 8 a process output control unit, numeral 9 a process input control unit, numeral 10 a plant, numerals $11_1$ to $11_m$ control devices, numerals $126_1$ to $12_m$ detectors of the operating conditions of the control devices, and numeral 13 a keyboard. The method of operating the control screen and the pushbottons on the control board will be explained. In FIGS. 3A and 3B, the character A designates "automatic" mode and character H "manual" mode. When the "H" button in (1) is pressed while pressing the "A/H" botton on the control board, the manual operation becomes possible, and the indication color of "H" on the control screen 20 changes to a color representing the manual mode is being selected. It is assumed that an indication botton (such as "OPEN" button) is one of the control data selection areas 21 on the control screen 20. The position (in terms of X-Y coordinate) touched on the touch screen 4 is applied to the computer 1 through the touch screen control unit 5 (FIG. 2). In the case where the position indicated by a button is touched, the computer changes the color of the indication button (the color of the frame of the OPEN button) thereby to confirm the appropriate selection. If the touch operation is made at other than the button-indicated position on the screen, by contrast, an operation error message is displayed. If the operator notes that he has touched a wrong button, on the other hand, he may cancel the selection by touching the "CANCEL" button in the control frame. When a pushbutton (pushbutton $6_1$) corresponding to the number of the control frame is pressed, a signal is applied to the computer 1 through the pushbutton signal input unit 7, and the computer 1 decides on a control frame with which the pushbutton pressed is associated. If the correct pushbutton is pressed, the computer 1 applies a control signal corresponding to the control data of the selected indication button ("OPEN" in the case under consideration) to the control device involved (such as $116_1$) through the process output control unit 8. The position of the control device is applied through the process input control unit 9 to the computer 1 by the operating condition detector ($12_1$ in the case under consideration), thereby indicating the operating condition of the control device by changing the color of the indication button (such as to red if full open) in accordance with the prevailing condition. When the operator presses the "A" button of (1) while keeping the "A/H" button pressed on the control board, the automatic mode is entered with "A" on the control screen 20 changing to a color indicating the automatic mode. In the automatic mode, the control device starts open or close operation automatically in response to a command from the computer 1.

The frame (2) of the control screen 20 provides an example of an automatic valve requiring intermediate opening. As in the case of frame (1), manual operation is selected, and then by touching the "OPEN" button on the control screen 20, the pushbutton $6_2$ is pressed to start to "OPEN" the valve. If the "HOLD" button on the control screen 20 is touched followed by pressing of the pushbutton $6_2$, the valve instantly stops and holds the position prevailing at that particular time point. The pushbuttons $6_1$ to $6_8$ have attached thereto an increment mark "▲", and have other functions for starting the operation of control devices in program software. The frame (3) shows the case of a pump. When the operator touches the "START" button on the control screen 20 and presses a pushbutton 63 after confirming that the color of the button has changed, the pump is started.

The frame (4) on the control screen 20 shows the case of a valve. The control screen for an object such as a valve which operates very slowly is limited to display, because of a very limited hazard due to the slow motion after an erroneous press of the button. The character Po designates an actual opening or a control signal value for opening, Ps a control set value, and Pv a feedback value of the actual process. At the press of the button "▲" or "▼" of ④ on the control board, the valve is actuated in a manner which is displayed on the control screen. The characters AAA to DDD at the upper part of each control screen 20 shows the name of a control device. In the case of the system diagram method, the pushbuttons on the control board and the control screen displayed at the same time as the control device are operated the same way as in the system menu method mentioned above.

Figure 4:
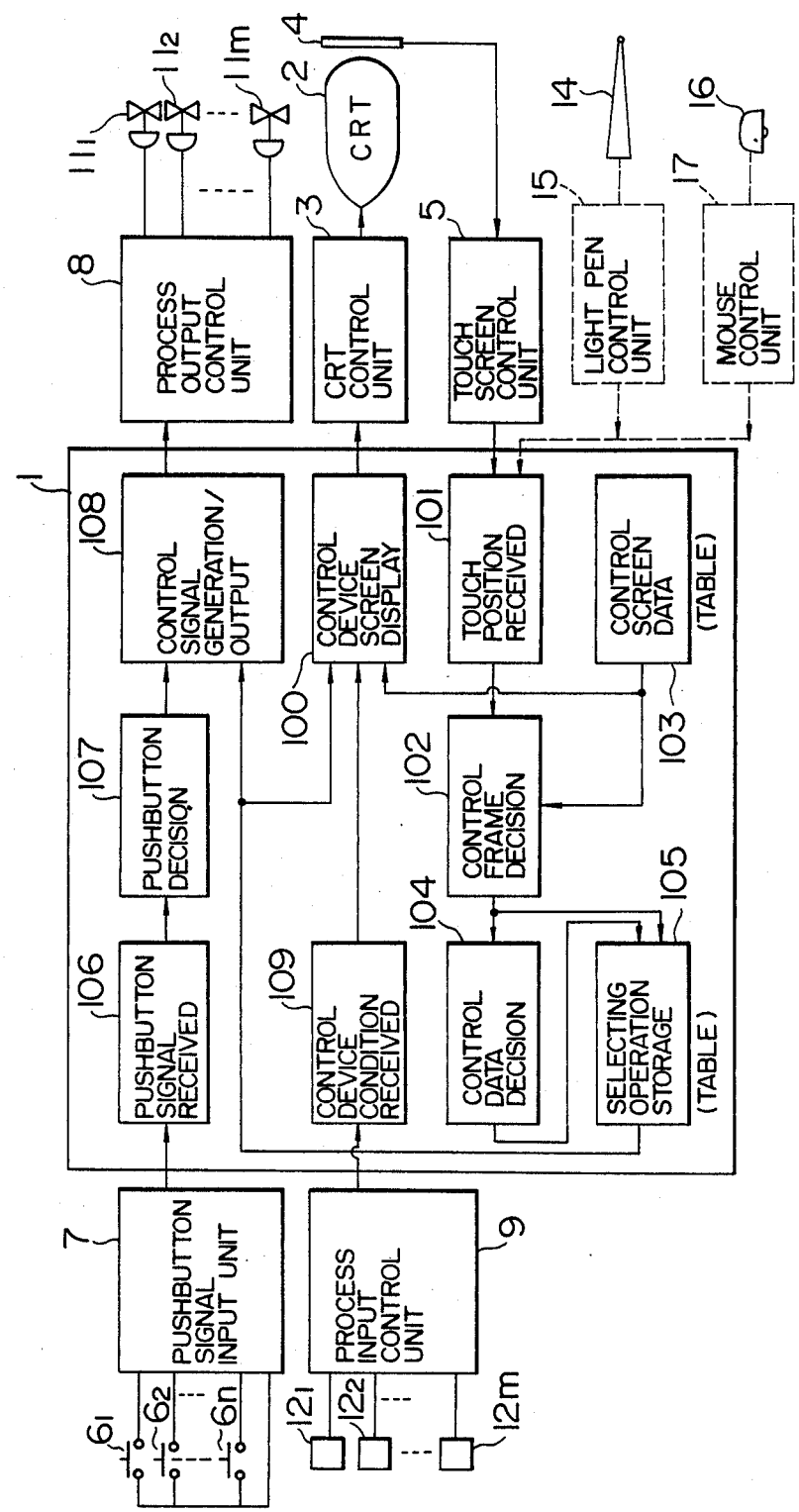
FIG. 4 is a computing processing block diagram of the computer included in FIG. 2.

FIG. 4 is a block diagram showing the processes in which data are processed in the computer 1. The control screen is displayed on the CRT display unit 2 through the CRT control unit 3 by the control device screen display block 100 on the basis of the position of the control device operation received through the process input control unit 9 from the control device operating position detectors $12_1$ to $12_m$ in accordance with (a) the control screen data table 103 and (b) the control device condition retrieval block 109. Upon touch of the touch screen 4, the touch position (coordinate) retrieval block 101 retrieves the touch position (coordinate) data on the display screen through the touch screen control unit 5. On the basis of this data, the control frame decision block 102 decides which control frame has been selected and further the control data decision block 104 decides the control data selected. The result of these decisions (102, 104) are stored in the selecting operation storage table 105. At the press of the pushbutton 6 corresponding to the control screen, a pushbutton signal is received through the pushbutton signal input unit 7 by the pushbutton signal receiving block 106, and the pushbutton is determined by the pushbutton decision block 107, so that a control frame for which the control signal is to be produced is decided. This result, together with the control frame and the control data stored and selected earlier, are used to produce through the process output control unit 8 a control signal associated with the control data selected to the control device by the control signal generation/output block 108. In the case where a plurality of operations are selected for a plurality of control devices on the control screen, the control frames and the control data thus selected are stored in the selected operation storage table 105. In the case where the pushbuttons corresponding to the selected control frame are pressed continuously or at the same time, the respective control devices may be operated in an interlocked or parallel manner.

Figure 5:
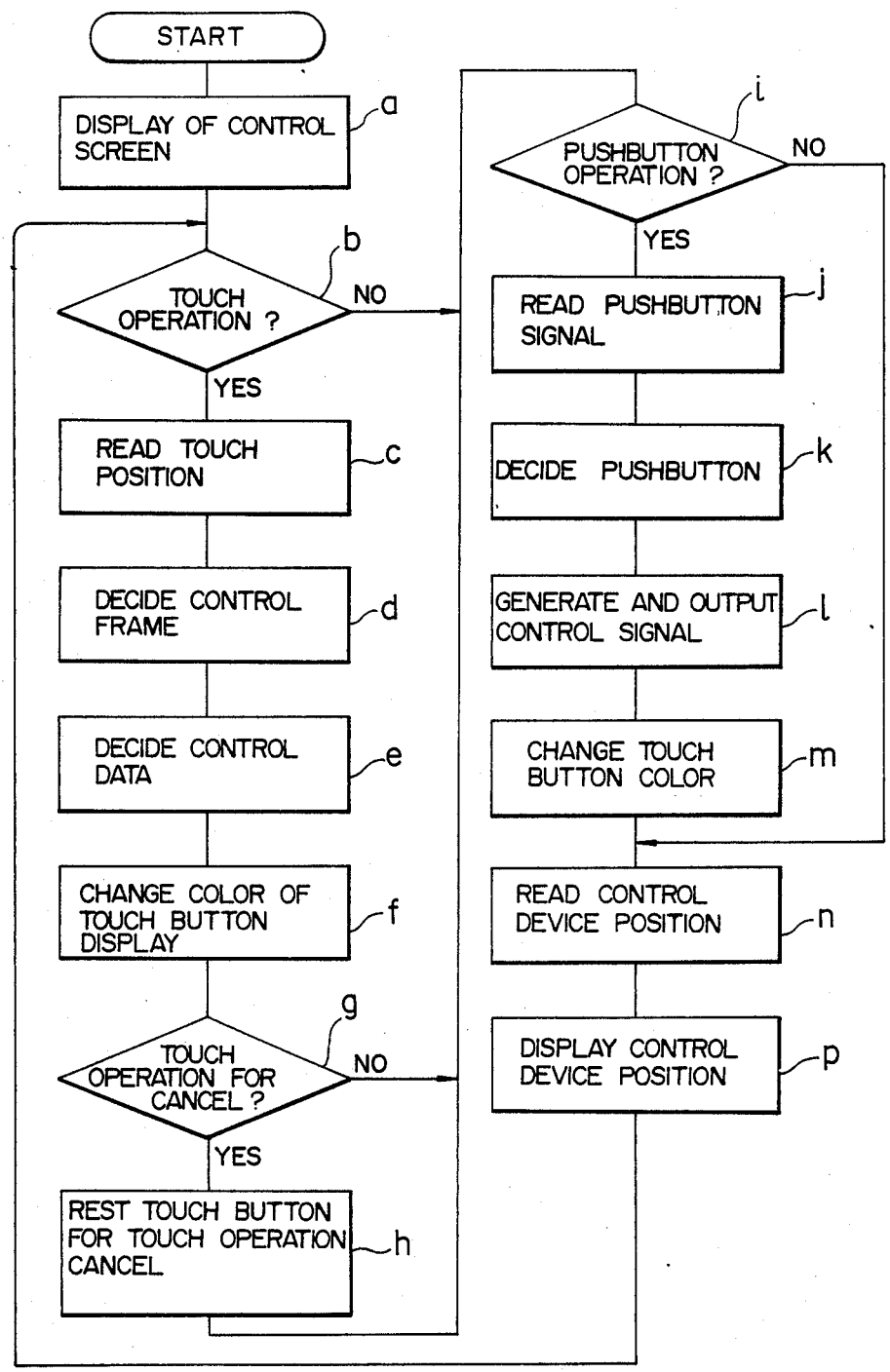
FIG. 5 is a flowchart according to the computing processing block diagram shown in FIG. 4.

FIG. 5 shows a flowchart of computation of the computer 1 shown in FIG. 2 according to the program of FIG. 4. Step a displays a control screen selected by touch of a display screen of a system overview. Step b checks for a touch operation, and if there is no touch operation, step i checks whether a pushbutton operation has been performed or not. In the absence of a pushbutton operation, step n reads the operating position of a control device, followed by step p to indicate the operating position of the control device and the step b where the process is returned. If a touch operation is detected at step b, step c reads the touch position (coordinate) on the display screen, followed by step d for decision on the control frame and step e for decision on the control data. Step f then changes the indication color of the touch button involved in such a manner as to clarify the content of display. Step g checks for the touch operation of the "CANCEL" indication button for cancelling the selected data, and in the absence of such a touch operation, the process proceeds to step i, while in the presence of such a touch operation, the data selected by the immediately preceding touch operation is cancelled to restore the color of the indication button to the original color. If the operation of the starting pushbutton has been found to be performed on the control board at step i, the pushbutton signal is retrieved at step j followed by step k for decision on the pushbutton. Then step l generates a control signal based on the control frame and the content of operation selected at steps d and e. The control signal is then applied to the control device involved, followed by step m for changing the indication color of the indication button. Step n then reads the operating position of the control device, followed by step p for indication of the operation position of the control device on the control screen, thus repeating the step b and those subsequent thereto.

Figure 7:
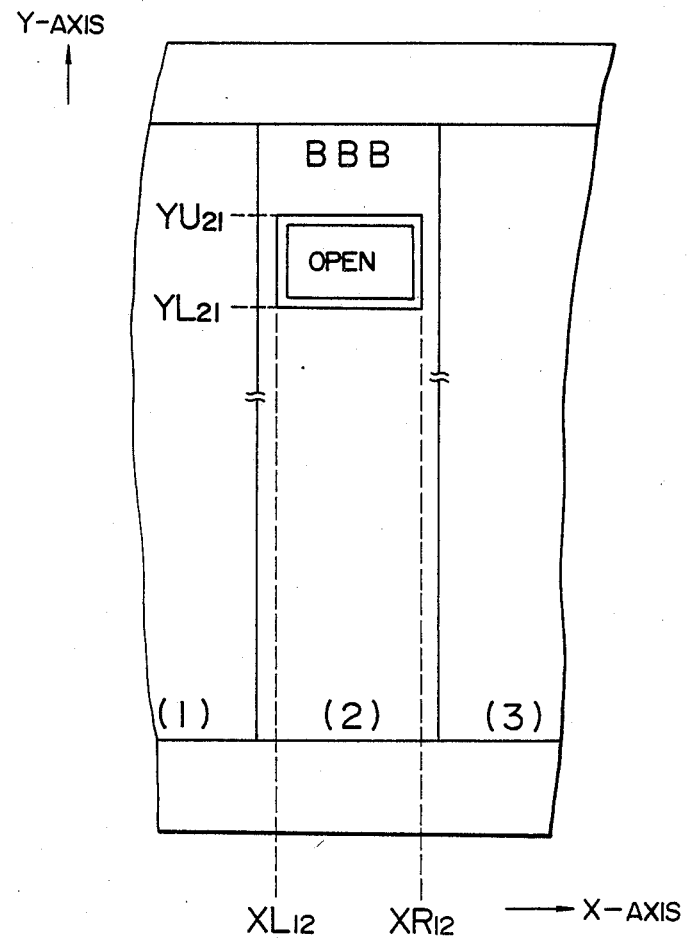
FIG. 7 is a diagram for explaining FIG. 6.

FIG. 6 shows an embodiment of the control screen data table 103 of FIG. 4 associated with the control screen shown in FIG. 3A. The table I is provided for each control screen displayed at the CRT display position by touch operation, and a screen number together with the X-axis value of the boundary of a touch operation effective area of the indication button is stored for each control frame displayed on the particular screen. An example of the X-axis value for the indication button "OPEN" of the control frame (2) is shown in FIG. 7. The table II, on the other hand, stores the Y-axis value of the boundary of the touch operation effective area of the indication button in the frame for each control frame registered with the table I. An example of the indication button "OPEN" of the control frame (2) is shown in FIG. 7. The table III stores the function codes (in digital codes representing such functions as "OPEN", "CLOSE", "START" or "STOP") of the respective indication buttons registered with the table II.

A method of using these tables will be explained with reference to FIG. 4. When the touch operation is performed on the control frame, a control frame decision block 102 compares the touch coordinate received from a touch position (coordinate) receiving block 101 with the X coordinate stored for the table I corresponding to the screen number of the control screen on display thereby to decide a control frame the area of which has been touched. A control data decision block 104 decides an indication button of the control frame that has been touched, by comparison with the Y coordinate stored for the table II of the same frame. The control data selected is thus decided by use of the table III with this button number. The control frame and the content of operation thus determined are stored in a selecting operation storage table 105, which is applied to a control signal generation/output block 108 together with the data from the pushbutton decision block 107 if the operation start pushbutton is pressed correctly, thus producing a control signal for operating a control device actually.

Now, a preferred embodiment of the display unit for the control screen according to the present invention will be explained. The display unit according to this embodiment is constructed in accordance with the system diagram method shown in FIG. 1B.

The display of the control screen in the display unit according to the present invention is subjected to a programmed control of computer. The system is generally configured of a CPU for centralized control of data processing, RAM and ROM as memories, an input/output control device, a touch screen, a CRT and a keyboard.

In a first display unit, assume that the control device is touched to display the control screen in combination. The control screen is displayed in combination at a position where the control device involved is not hidden. It is also possible to move the control screen to another position by touch operation.

Examples of display of the control screen are shown in FIGS. 8A and 8B and FIGS. 9A and 9B.

Upon touch of the control device 111 on the system diagram 129 in FIG. 8A, a control screen 100 is displayed at the end of the display screen far from the control device 111 as shown in FIG. 8B.

The control screen 100 illustratively shown is the same type of control screen as the frame (4) in FIG. 3A and is associated with a valve the sole function of which is display. Character Po designates an actual amount of operation or a control signal value, Ps a control set value, and Pv a feedback value of the actual process. By operation of the pushbutton 6, the valve is actuated, and the condition thereof is fed back to the control screen 100 from time to time to permit monitoring.

FIG. 9A shows a case in which the control device 112 is touched on the same system diagram type of display screen 129 as in FIG. 8A. In this case, the control screen 110 is displayed at a position where the control device 112 is not hidden.

Figure 10A:
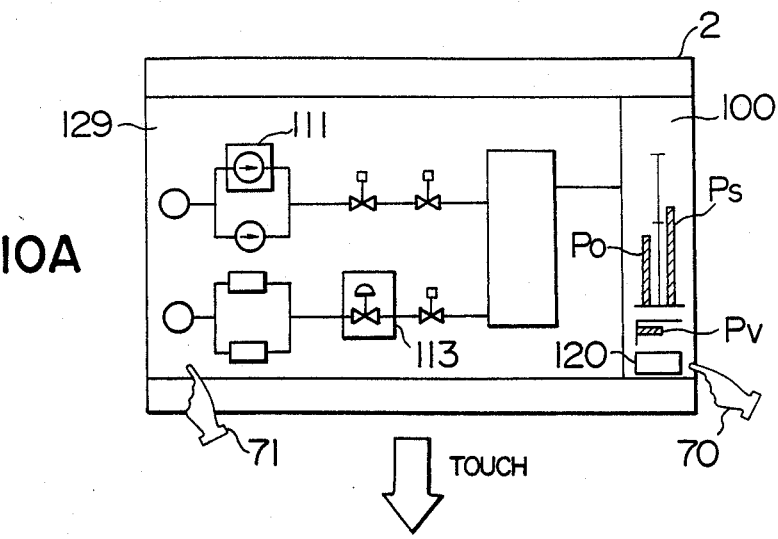
FIGS. 10A, 10B and 10C are diagrams showing an example of the moving display on a control screen.
Figure 10B:
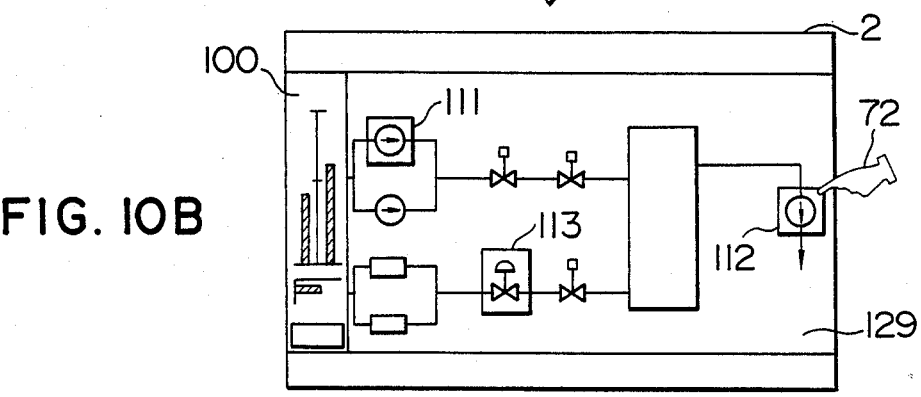
Figure 10C:
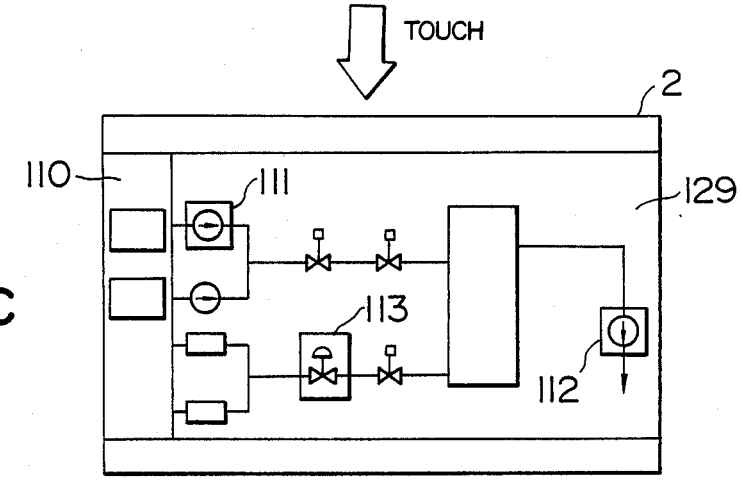

FIGS. 10A, 10B and 10C show an embodiment in which the control screen is moved. Represented is a case in which the control device 112 hidden behind the control screen 100 of the control device 111. First, a control screen move request receiving area 120 at the lower part of the control screen in FIG. 10A is touched at 70 and then the destination is touched at 71. As shown in FIG. 10B, the control screen 100 moves to the point of the touch operation 71, and the control device 112 appears. The control device 112 is touched as shown by 72, so that as shown in FIG. 10C, the control screen 110 for the control device 112 is displayed at the end of the display screen far from the control device 112.

Figure 11:
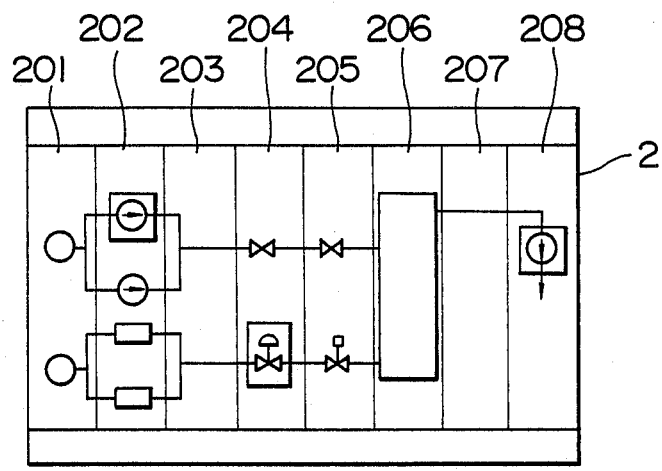
FIG. 11 is a diagram showing an embodiment of display blocks of a display screen.

Now, a program for the present embodiment will be explained. The display screen of CRT 2 is divided into eight blocks 201 to 208 as shown in FIG. 11. Each block has the same size as the control screen. The coordinates of these blocks are stored in the memory.

Figure 12:
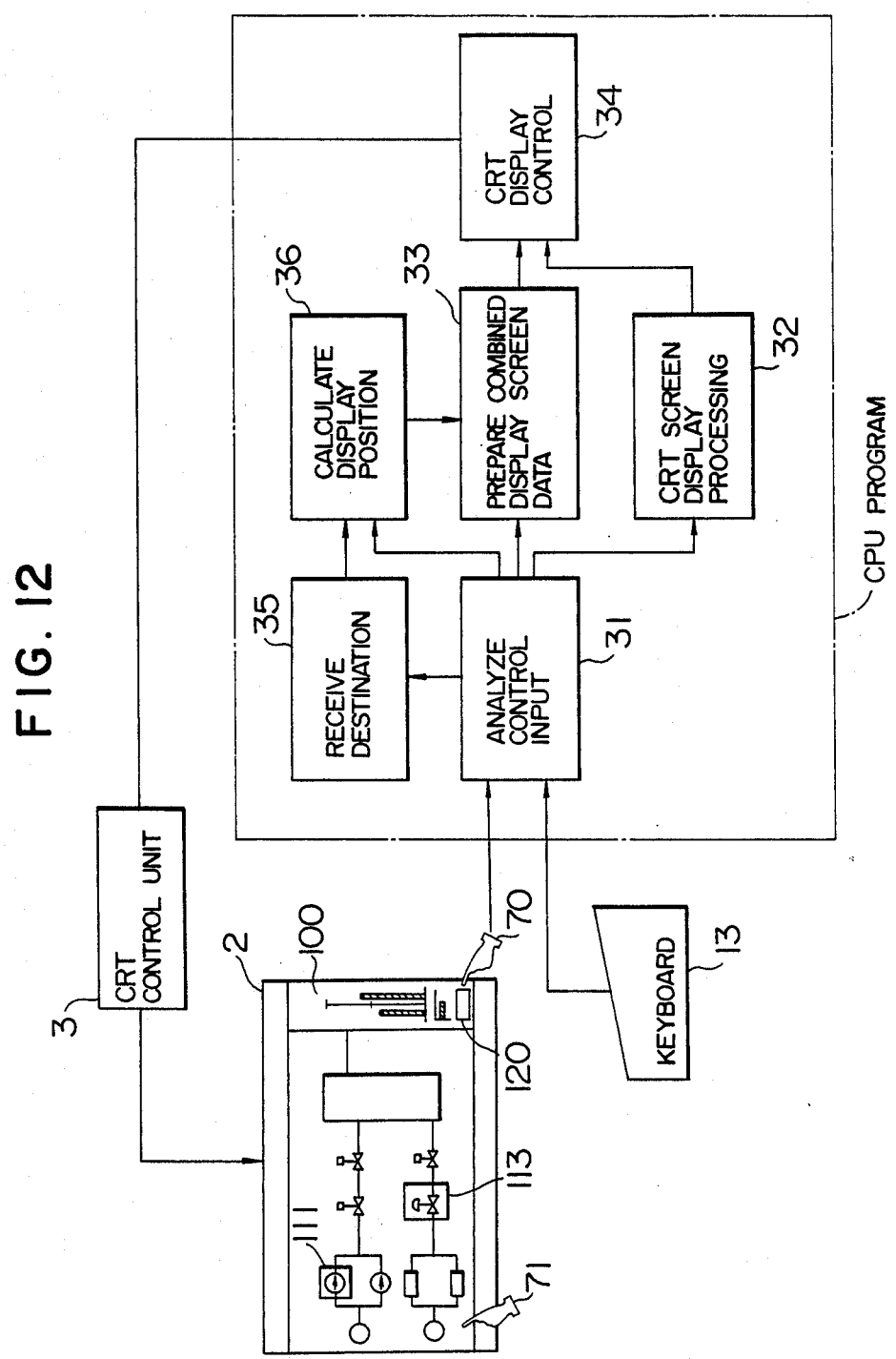
FIG. 12 is a computing processing block diagram for combined display of a control screen.
Figure 13A:
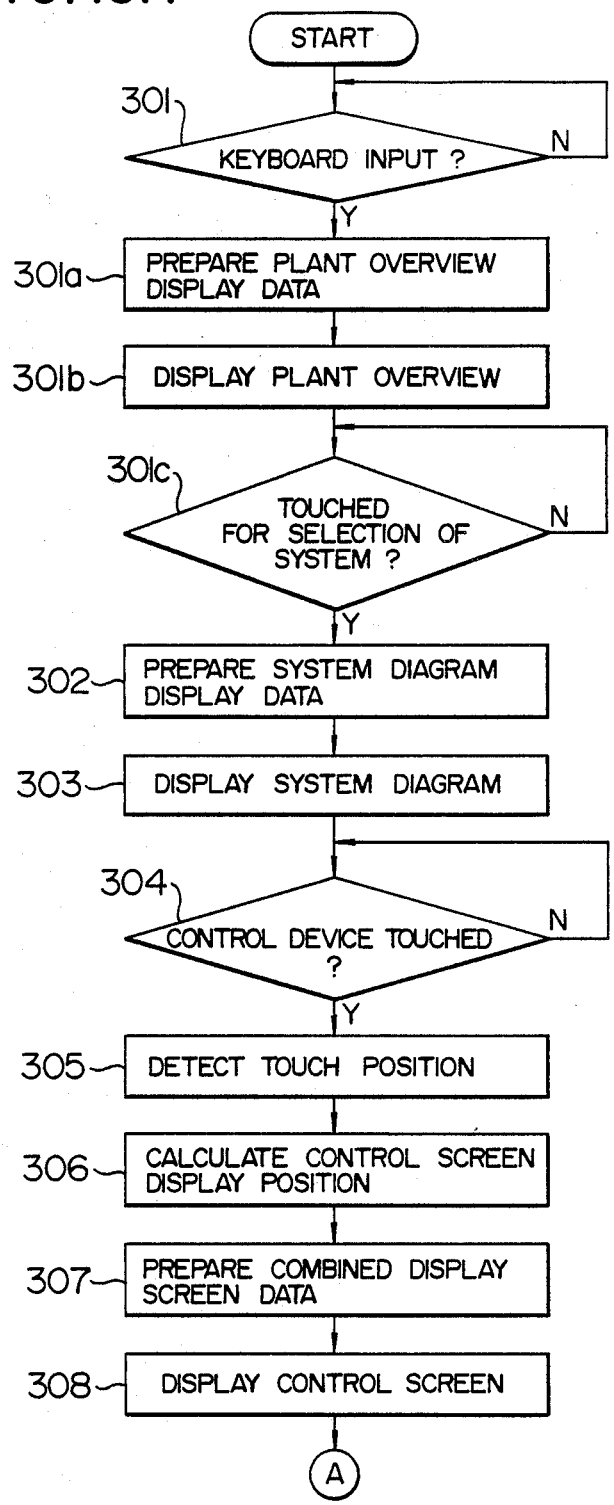
FIGS. 13A and 13B are flowcharts for combined display according to the computing processing block diagram of FIG. 12.
Figure 13B:
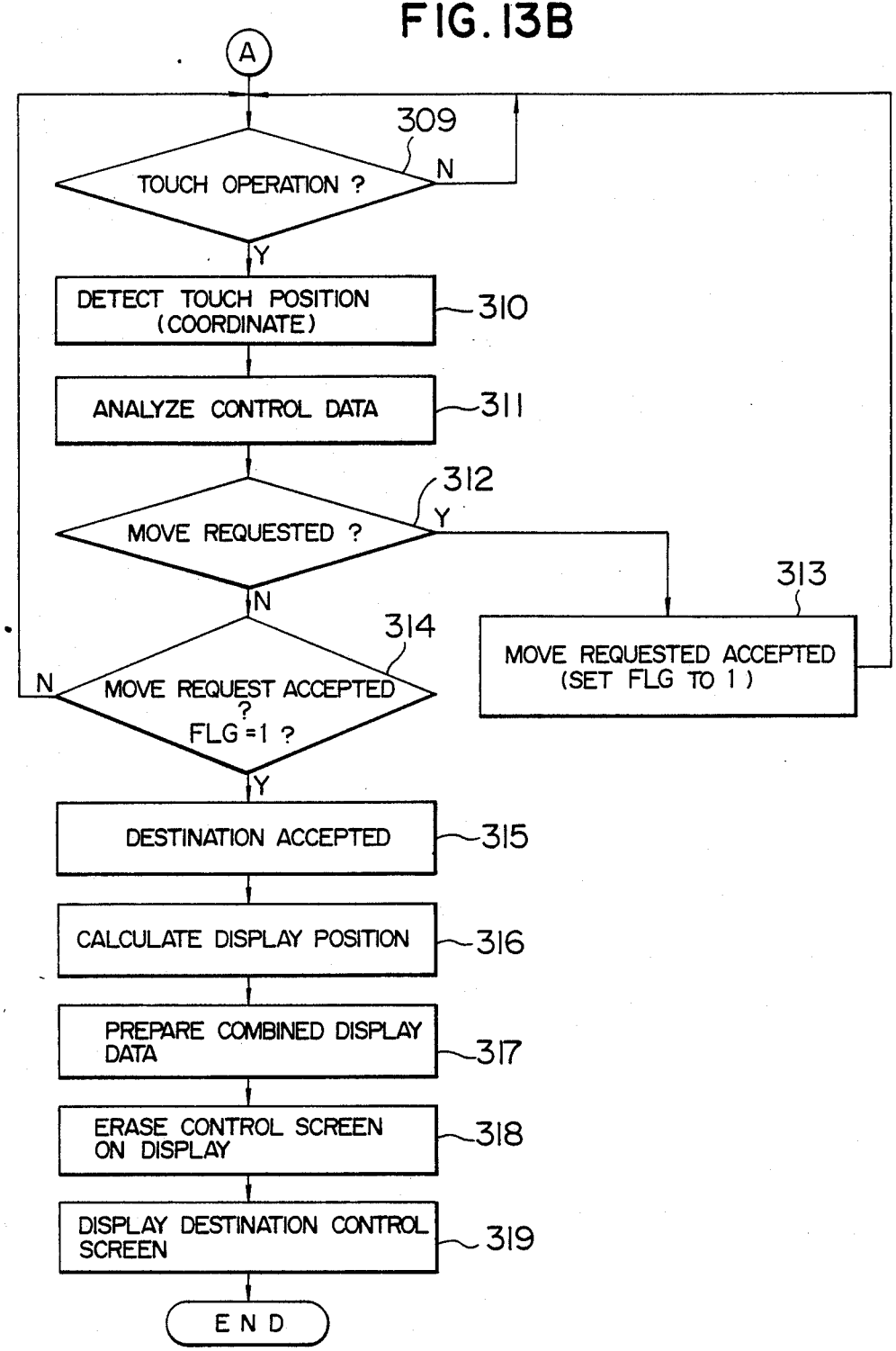

A functional block diagram of the computing processing program is shown in FIG. 12, and a flowchart thereof in FIG. 13.

In FIG. 12, a control input analysis block 31 decides whether an input is by way of keyboard or touch screen, and analyzing the input data, detects the coordinate of the touch position. A CRT screen display processing block 32 generates an image data of a system diagram to be displayed in accordance with the instruction entered by way of the keyboard.

A combined display screen data preparation block 33 prepares a combined display screen of a control device and a control screen. A CRT display control block 34 prepares a scan data to be applied to the CRT control unit 3 for actually scanning the CRT in accordance with the data on the display screen. A destination receiving block 35 receives a move command for moving the control screen by touch operation. A display position calculation block 36 is for calculating the proper position as a control screen.

Now, a flowchart for combined display according to the block diagram of FIG. 12 will be explained with reference to FIG. 13. Step 301 receives a system diagram method key from the keyboard, step 301a prepares a display screen data of a plant overview and step 301b displays the plant overview. When a touch on the typical picture indicating a system in the overview detected at step 301c, step 302 prepares a display screen data corresponding to the selected system, and step 303 displays the system diagram.

When the control device of the system diagram screen on display is touched for operation, step 304 receives it, step 305 detects the touch position by coordinate, and step 306 calculates the display block farthest from the control device thus touched (FIG. 11). Step 307 prepares a combined display screen of the control device and the control screen containing the display data on the control device, followed by step 308 for combined display of the control screen together with the control device in the display block calculated at step 306.

If the move request section (120 in FIG. 12) on the control screen is touched for operation as shown by 70, step 309 decides whether a touch operation has been made or not, followed by step 310 for detecting the coordinate of the touch position. Step 311 decides whether or not this coordinate corresponds to that of the move request section on the control screen, and if so, step 312 recognizes that the particular touch is for requesting a move, thus setting the flag (FLG) to "1". If the touch is on a totally unrelated section, by contrast, step 314 checks that FLG is not "1", and the process returns to step 309.

If step 314 finds that FLG is "1", step 315 accepts the touch 71 at the destination on the control screen, followed by step 316 for deciding a display block associated with the touch position. Step 317 prepares a combined display screen data of the control device and the control screen after move of the control screen, step 318 erases the control screen on display, and step 319 displays the control screen at the destination.

According to this embodiment, the move request touch area 120 is provided. As an alternative, it is also possible to configure the system in which a move request command is obtained by touching any desired point in the control screen.

Further, the destination may be determined in advance at the farthest display block from the control screen on display so that the control screen is automatically moved to the predetermined position by touching the move request area.

A second display unit is intended for reduced display of the whole system diagram for each control device in the part of the display screen not including the control screen.

When two control devices are touched, two control screens are displayed side by side, with the remaining section of the display screen displaying the whole of the first system diagram in reduced form.

It is also possible to display data related to operation in a section adjacent to the control screen, in which case the whole of the original system diagram is displayed in reduced form in a section adjacent to the related data display screen and the control screen.

Figure 14:
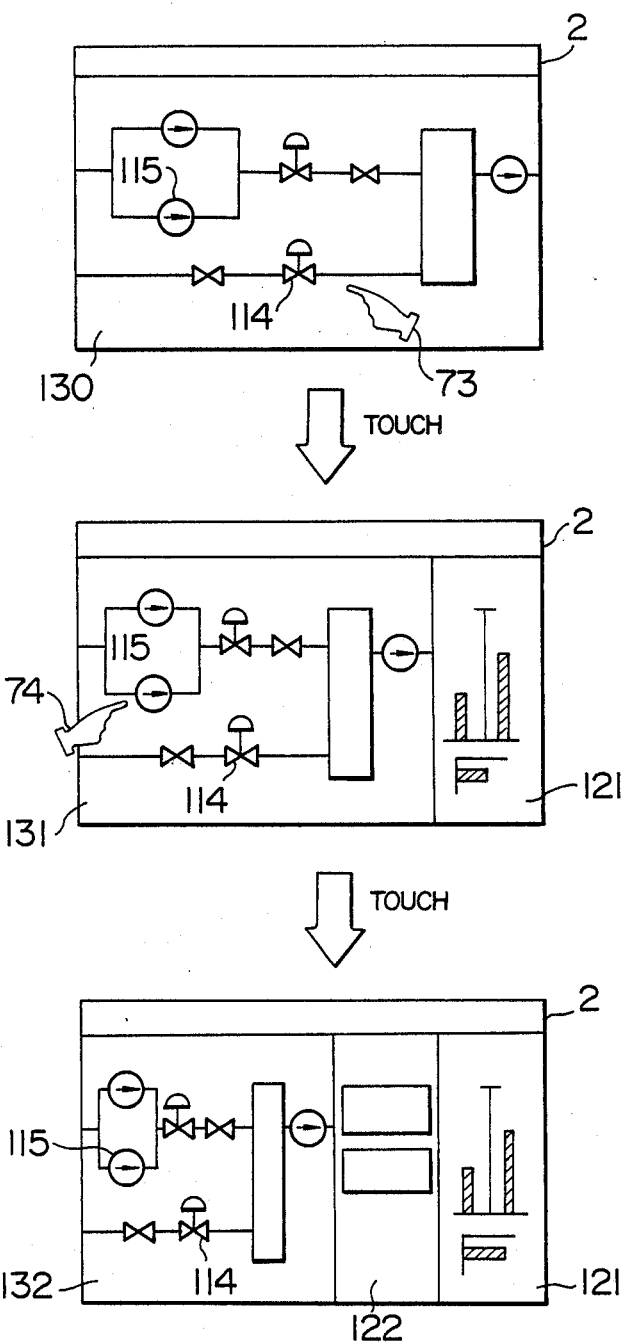
FIG. 14 is a diagram showing an embodiment of a reduced display.

FIG. 14 shows an embodiment of reduced display. When a control device 114 is touched for operation as designated by 73, a corresponding control screen 121 is displayed on the right side of the display screen and the original display screen 130 in reduced form as 131 in the remaining part of the display screen.

Another touch operation 74 on the control device 115 causes a corresponding control screen 122 to be displayed adjacently to the control screen, with the reduced screen 131 further reduced as designated by 132.

Figure 15:
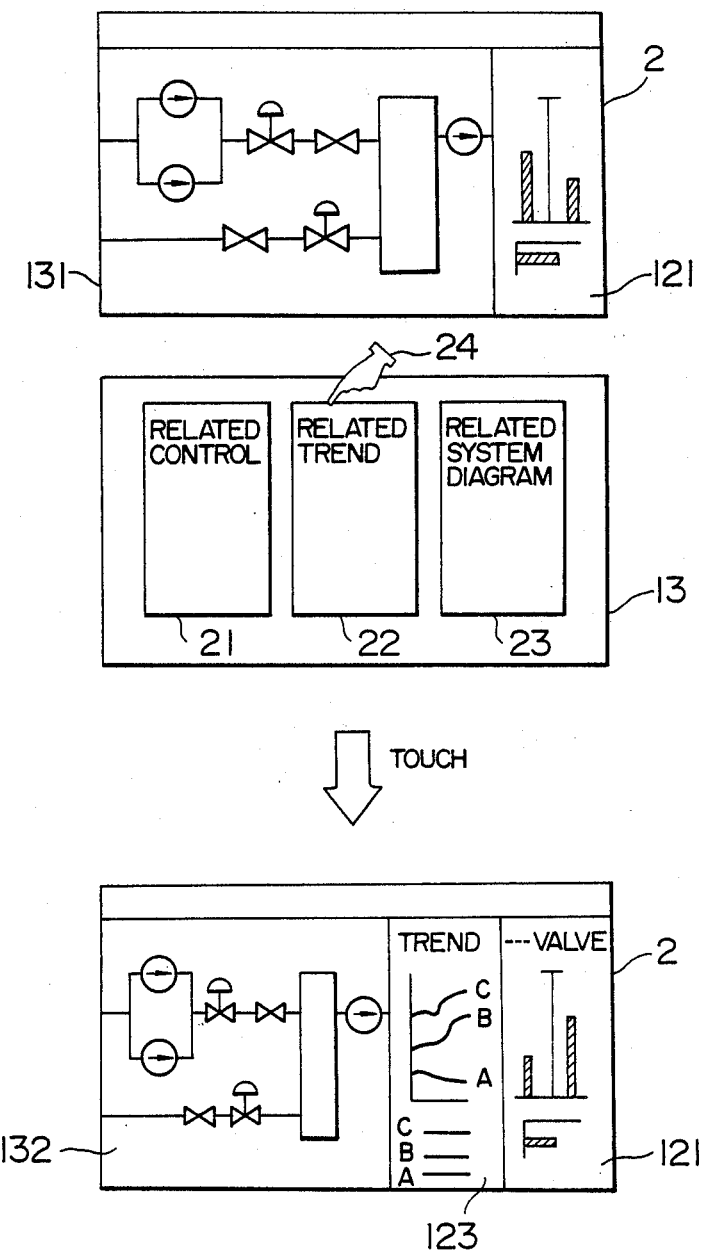
FIG. 15 is a diagram showing an example of calling and displaying a related trend diagram in the reduced display.

FIG. 15 is a diagram showing an example of displaying data related to operation together with a control screen.

When the control screen 121 is displayed in combination, the type of the data related to the operation is designated through the keyboard 3. When it is desired to display the operating condition of the control device in analog trend graph, the operator presses a related trend pushbutton 22 as designated by 24. As a result, the trend screen 123 is displayed at a section adjacent to the control screen 121, and the original screen 131 in reduced form in the remaining display area as designated by 132.

In the case of displaying at least three screens including the control screen and the related data screen, the original system diagram displayed in reduced form might be excessively small. When the reduction rate is otherwise reduced below a specified value, therefore, the reduction rate is fixed to a critical value to maintain the good visibility of the system diagram and the good operability of the touch buttons, while the control screen is displayed in scroll, in such a manner that the display of the control screen is changeable by key operation.

Figure 16:
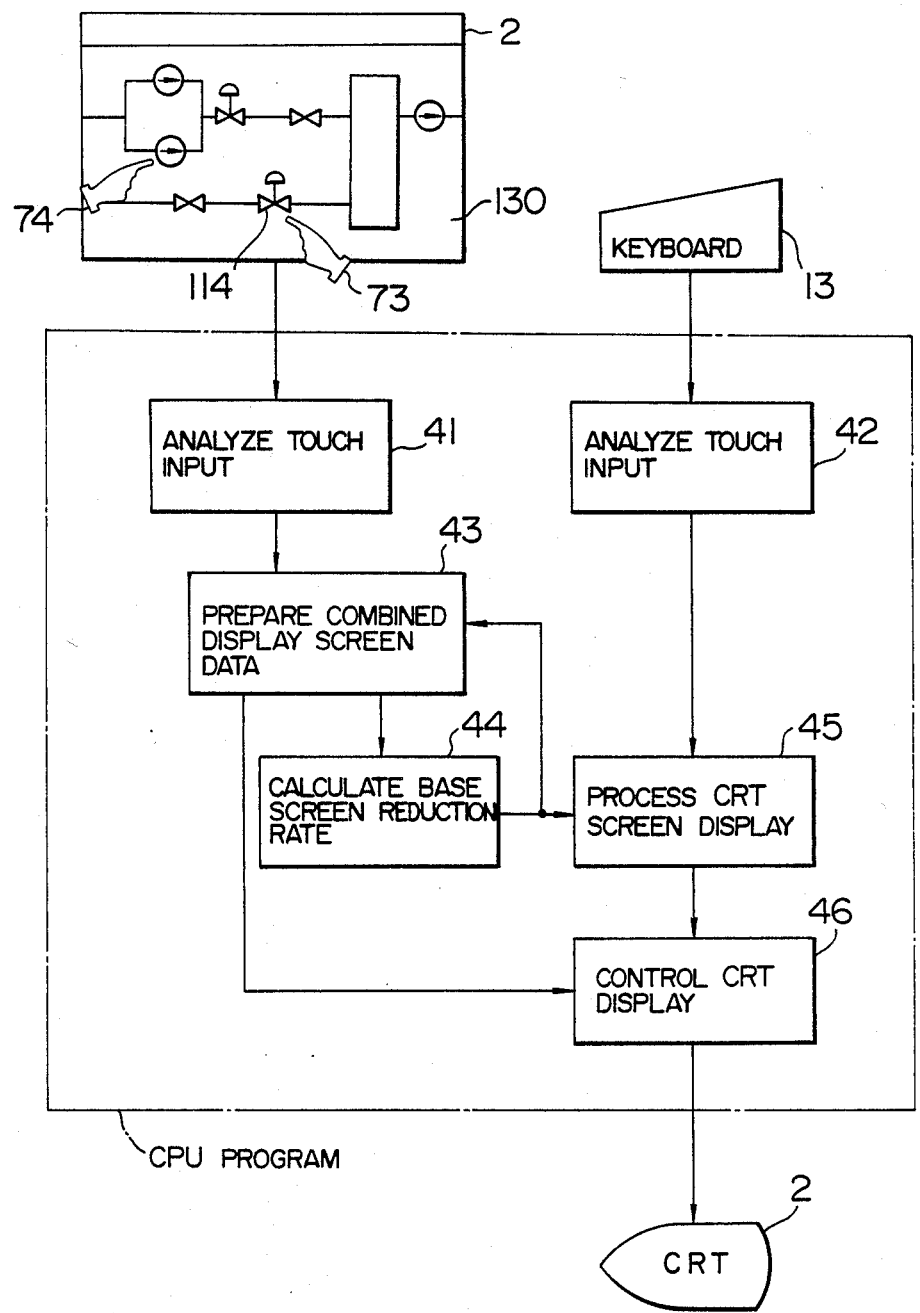
FIG. 16 is a computing processing block diagram for the reduced display.

The reduced display is accomplished by the programmed control of the computer. The computer comprises a CPU, a RAM, a ROM, an input/output control device, etc. A computing processing block diagram of the computer is shown in FIG. 16. A touch input analysis block 41 is for detection of the coordinate of the touch position and the presence or absence of a touch operation. A control input analysis block 42 is for deciding on the data entered by the control keys on the keyboard 13. A combined display screen data preparation block 43 is for preparing a combined display screen data of a system diagram with typical pictures of control devices and a control screen for each control device. A base screen reduction rate calculation block 44 is for determining the reduction rare of the original system diagram screen in accordance with the number of control screens. A CRT screen display processing block 45 is for preparing a combined screen data on the basis of the data related to the display data. A CRT display control block 46 is for preparing a CRT scan data.

The flowchart for reduced display according to the computing processing block diagram of FIG. 16 will be explained with reference to FIG. 17. Step 411 displays a system diagram (base screen) with a diagram of control devices according to the processing routine including the control input analysis block 42, the CRT screen display processing block 43 and the CRT display control block 46. Step 412 decides whether a touch operation has been performed, and if affirmative, step 413 detects the coordinate of the touch position, followed by steps 414, 415 to determine whether a control device has been touched or not. If none is touched, the process returns to step 412. If a control device is touched, on the other hand, steps 416, 417 prepare a combined display screen data with a reduced base screen. Step 418 erases the first base screen, step 419 displays the reduced base screen, and step 420 displays the control screen.

Figure 18:
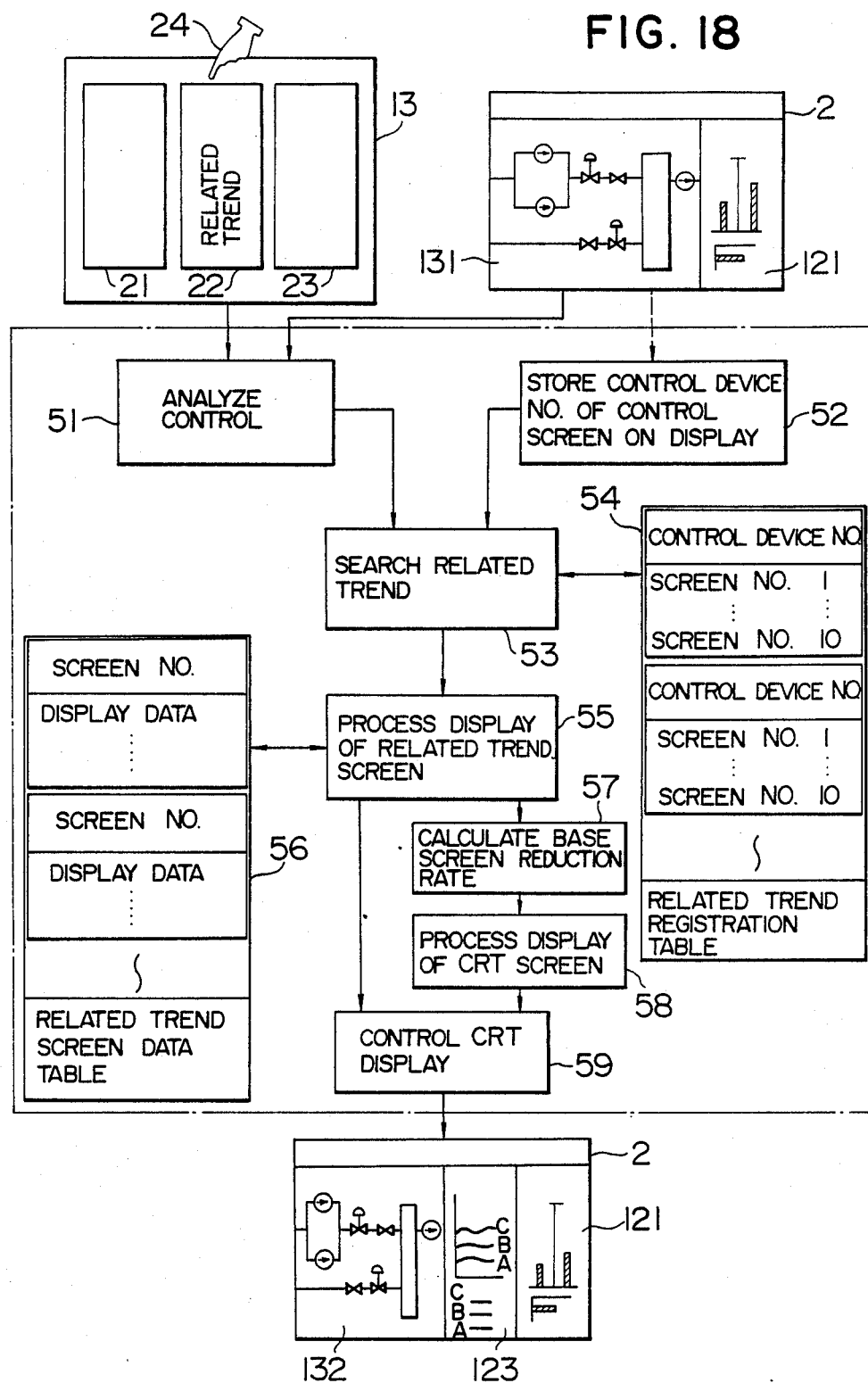
FIG. 18 is a program block diagram for displaying a related trend graph as a data related to the operation of the system.

FIG. 18 shows a computing processing block diagram for the trend graph display of FIG. 15. In FIG. 8, a control analysis block 51 is for deciding on the data of the control instruction by way of the control keys of the keyboard. A block 52 for storing the control device number of the control screen on display is to store the control device to be operated as a number. A related trend registration table 54 is for registering the number indicating the related trend screen for each control device. A related trend search processing block 53 sends the number of the control device involved to a related trend screen display processing block 55. A related trend screen table 56 is a combination of the related trend screen number for each control device and a display data related to the particular screen. The related trend screen changes each time the related trend button 22 is pressed on the keyboard to display the desired trend screen.

Once a trend screen is selected, the base screen is reduced at a base screen reduction rate calculation block 57, followed by a CRT screen display processing block 58 for preparing a combined display screen data of the base screen, the trend screen and the control screen. A CRT display control block 59 prepares a CRT scan data.

Figure 19:
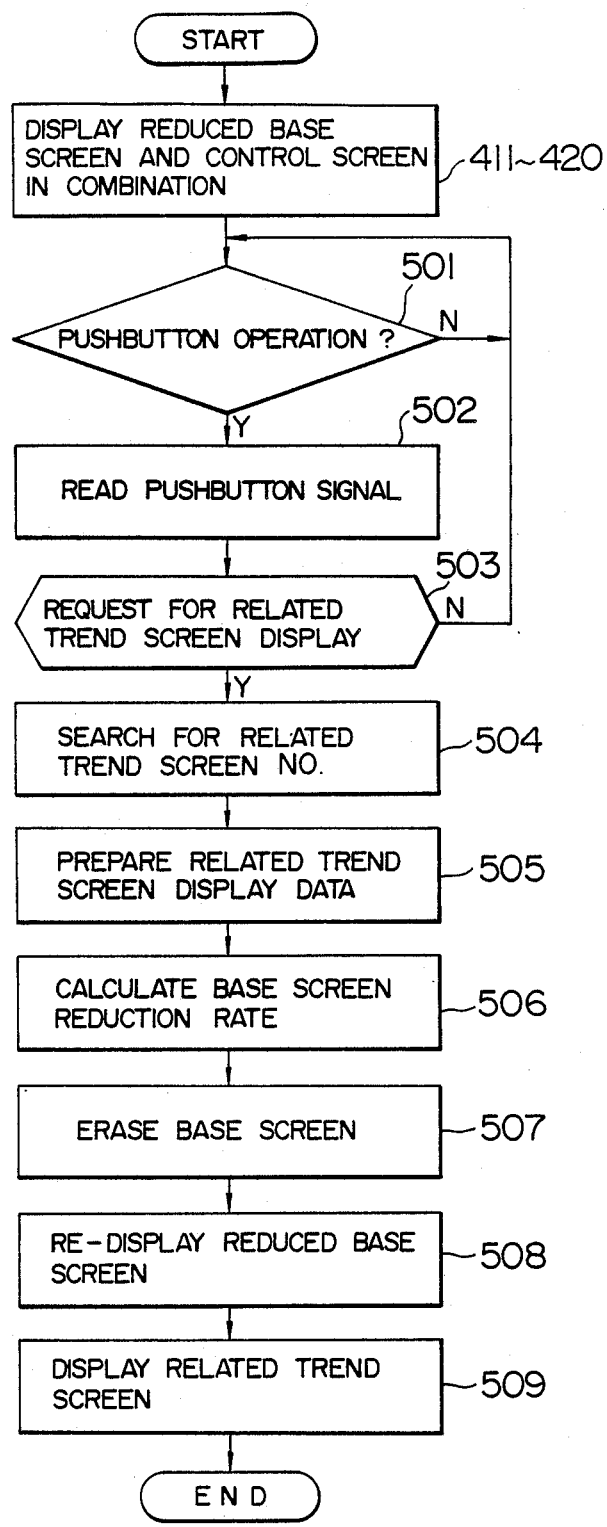
FIG. 19 is a flowchart for a related trend display according to the program shown in FIG. 18.

A flowchart for the related trend graph display according to the program of FIG. 18 is shown in FIG. 19.

Figure 17:
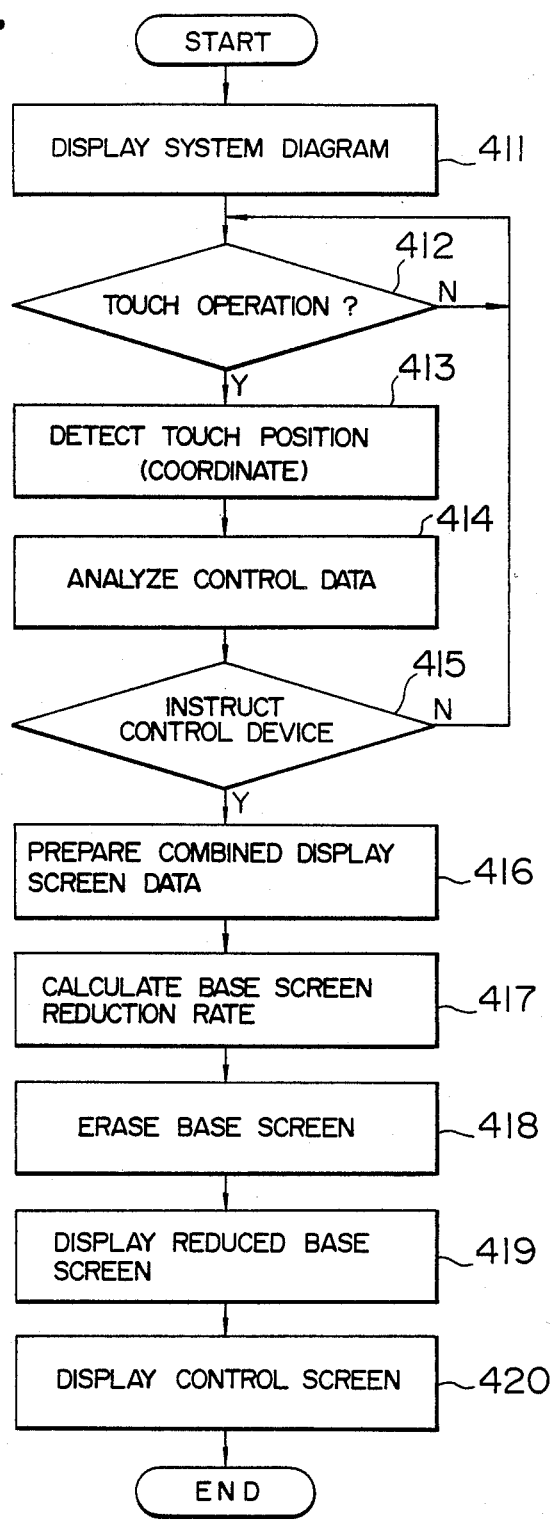
FIG. 17 is a flowchart for the reduced display according to the computing processing block diagram shown in FIG. 16.

A control screen and a reduced base screen are displayed in combination by steps 411 to 420 of FIG. 17. Step 501 detects whether a pushbutton on the keyboard has been pressed or not, and if any is pressed, step 502 analyzes the data of the pushbutton signal, followed by step 503 for deciding whether the pushbutton is for requesting a related trend screen. If it is not a button for requesting a related trend screen, the process returns to step 501, while if a related trend screen is requested, step 504 searches for a related trend screen No. from the tables 54, 56, and a display data for the related trend screen is prepared at step 505.

Step 506 calculates the reduction rate of the base screen, step 507 erases the base screen thus far displayed, step 508 displays a reduced base screen, and step 509 displays a related trend screen between the base screen and the control screen.

Figure 20:
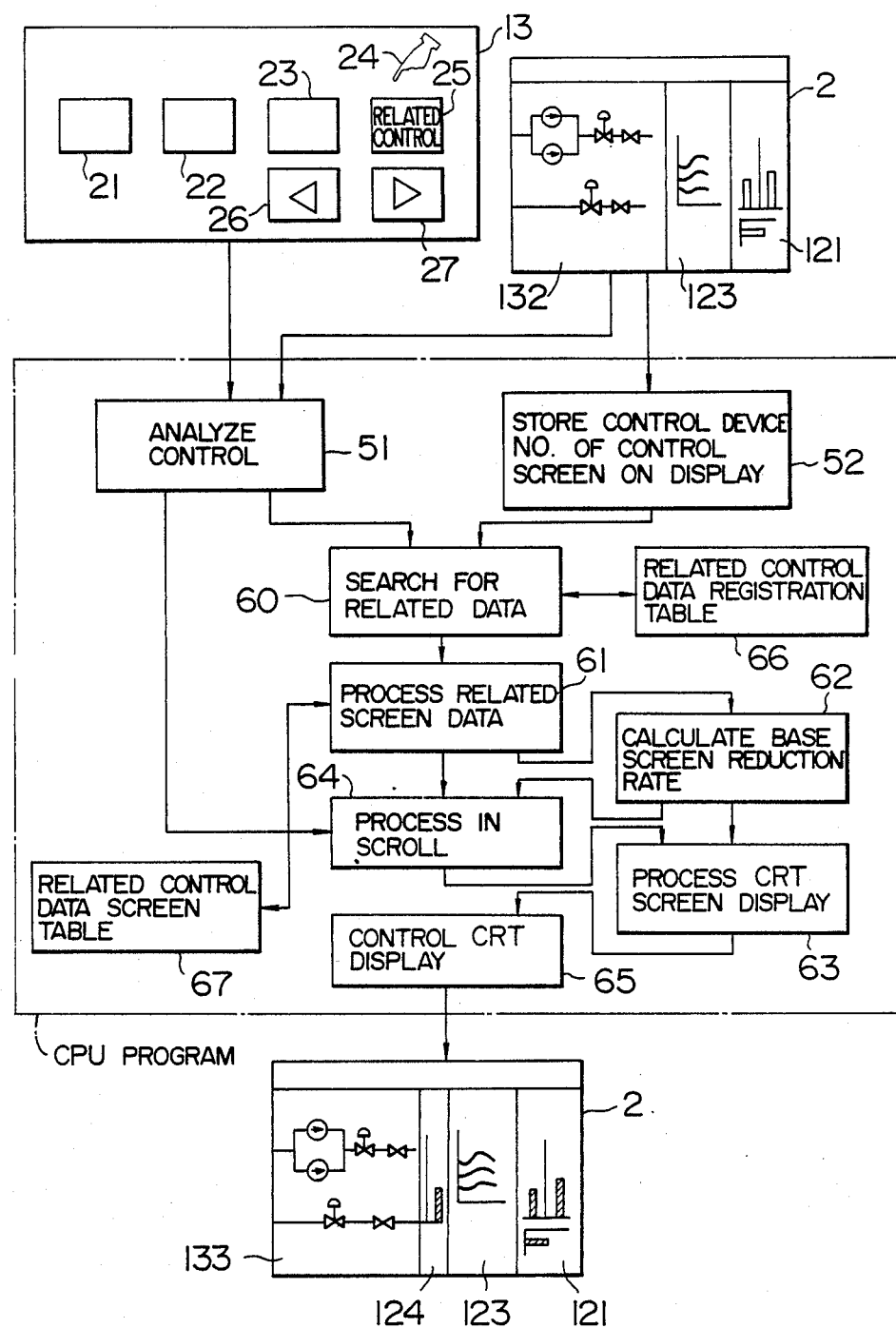
FIG. 20 is a computing processing block diagram for the scroll display of a control screen.

FIG. 20 shows an example of a program block for displaying a control screen in scroll with the base screen fixed to a predetermined reduction rate in order to prevent a request for more than two screens including the control screen and the operation-related screen from making the screens difficult to watch or operate with the base screen reduction rate lowered below a critical value.

A control analysis block 51 and a memory block 52 for storing the control device number of the control screen on display are identical to corresponding screens in FIG. 18.

A related-control data registration table 66 and a related control data screen table 67 are provided as component parts corresponding to the related trend registration table 54 and the related trend screen data table 56 in FIG. 18 respectively.

A control screen 121 and a trend screen 123 are displayed on the CRT. Further, at the press of a related control screen call button 25 on the keyboard 13 in order to display the data related to control, the content of the command is analyzed at the control analysis block 51 and the result transmitted to the related data search processing block 60. The block 60 and the related screen display processing block 61 cooperate to search the related control data screen to obtain a desired data screen. This process is identical to that for searching the related trend screen in FIG. 18. A base screen reduction rate calculation block 62 calculates the reduction rate of the base screen for display of a related data screen, and if it is impossible to display the control screen in a normal size unless the reduction rate is reduced below a critical value, the reduction rate of the base screen is set to a predetermined value while transmitting a command for scroll display of the control screen to the scroll processing block 64. A CRT screen display processing block 63 is for preparing a combined display data of a control screen in scroll display and a reduced base screen. A scroll processing block 64 prepares a scroll screen control signal according to the commands of the scroll development keys 26, 27. A CRT display control block 65 prepares a CRT scan data for a combined display screen including the scroll screen.

Figure 21:
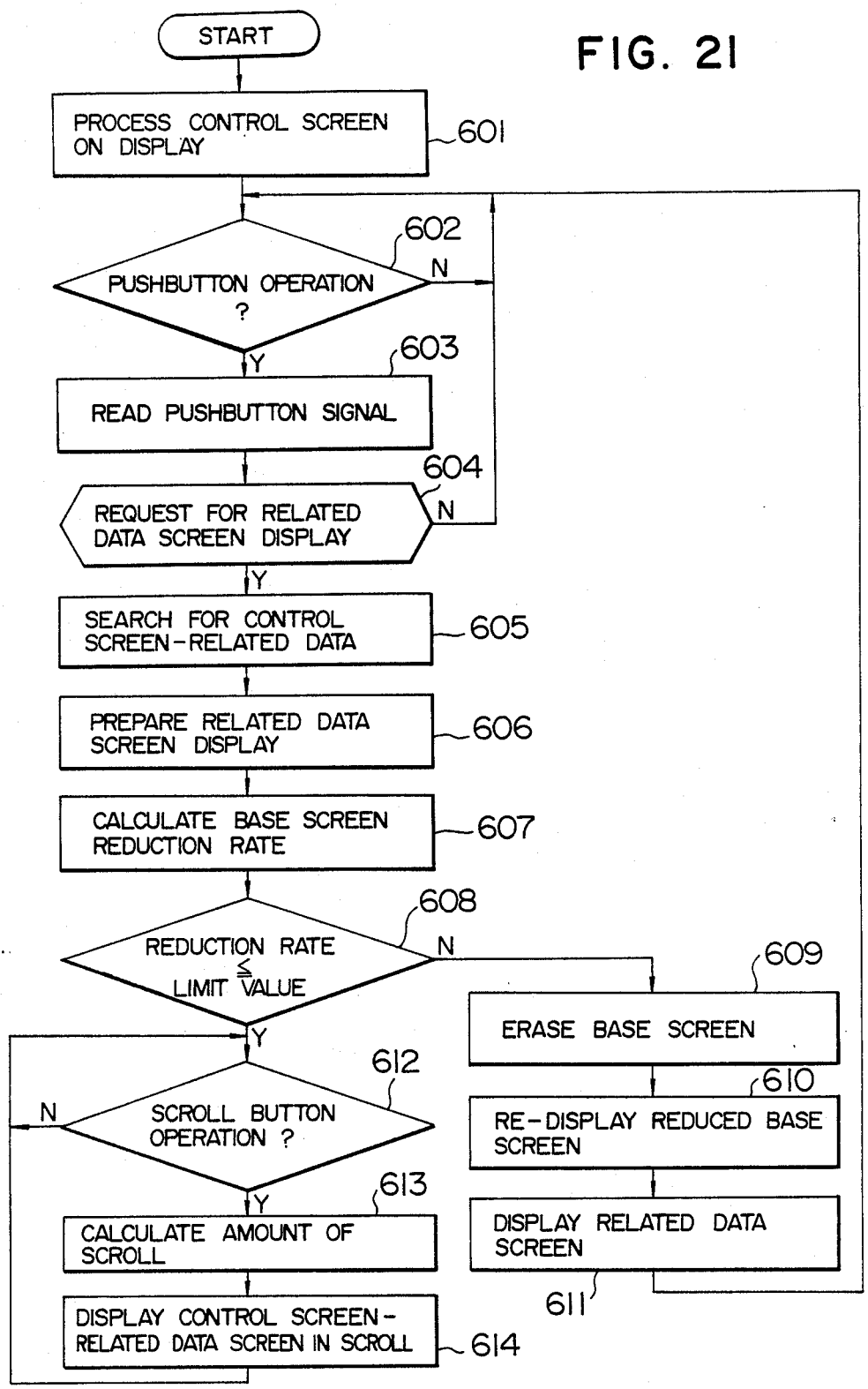
FIG. 21 is a flowchart for the scroll display of a control screen according to the computing processing block diagram shown in FIG. 20.

FIG. 21 shows a flowchart for scroll display according to the program of FIG. 20.

Steps up to 601 display two control screens according to the flowchart of FIG. 19. Step 602 accepts a signal from a pushbutton on the keyboard, and in the presence of a signal, step 603 searches the content thereof, followed by step 604 for deciding whether a request for display of the related data screen is involved or not. In the absence of such a request, the process returns again to step 602. In the presence of a request, on the other hand, steps 605 and 606 cooperate to search the tables 66 and 67 for the desired related control screen and prepares a display data.

Step 607 calculates the reduction rate of the base screen. If the control screen is to be displayed in normal size, step 608 checks whether the base screen is below a critical value. If it is not smaller than the critical value, step 609 erases the base screen on display, step 610 displays the base screen further reduced, and step 611 displays a control screen including the related data screen. If the reduction rate is below a critical value, step 608 fixes the reduction rate of the base screen to a predetermined value and generates a command for scroll display of the control screen. Step 612 detects whether the operation is performed for specifying the development operation of the scroll, and if such an operation is found to have been performed, step 613 calculates the amount of scroll, followed by step 614 for displaying the control screen moving in scroll.

In the aforementioned embodiments, the touch operation is performed by fingertip. As an alternative to this, the same function as the touch operation may be performed by light pen 14 or mouse 16 as shown in FIG. 4. In such a case, the touch screen control unit 5 is replaced with a light pen control unit 15 or a mouse control unit 17 as the case may be. The use of a light pen or a mouse permits an input instruction at a point, thus making it possible accurate instruction on the control device or the control data even on a display screen which could not be handled accurately by fingertip.

The present invention is not confined to the above-described embodiments but should be understood to include all embodiments in line with the spirit of the appended claims.

We claim:

1. A process monitoring and control system comprising:
    means for displaying a system diagram including diagrams of process control devices on a display screen of a display unit;
    input means for providing an instruction upon selection of a particular control device to be controlled;
    means for displaying on the display screen, together with at least a diagram of the selected control device, a control screen including at least one of a control data selection area and an operating condition display area corresponding to the particular control device upon an input instruction for selecting the particular control device from the diagrams of the process control devices;
    means for indicating to an operator the content of the input instruction upon provision of the input instruction for selecting control data in the control data selection area on the control screen; and
    means for providing an operation start signal to the particular control device selected by the input instruction upon operation of a switch corresponding to the control screen from which control data has been selected and belonging to a group from among groups of switches disposed outside of the display screen, each of the groups uniquely corresponding to a separate control screen.

2. A system according to claim 1, wherein the means for indicating to the operator the content of the input instruction includes means for changing a display condition of the control data selection area.

3. A system according to claim 2, wherein the input means includes a touch sensor arranged in a display unit for generating a signal indicating a contact position in response to the operator coming into contact with the touch sensor.

4. A system according to claim 2, wherein the input means generates a signal indicating a contact position of a light pen on a display screen.

5. A system according to claim 2, wherein the input means generates a signal indicating a position designated by a mouse on a display screen.

6. A system according to claim 1, wherein the input means includes a touch sensor arranged in a display unit for generating a signal indicating a contact position in response to the operator coming into contact with the touch sensor.

7. A system according to claim 1, wherein the input means generates a signal indicating a contact position of a light pen on a display screen.

8. A system according to claim 1, wherein the input means generates a signal indicating a position designated by a mouse on a display screen.

9. A method of process monitoring and control comprising the steps of:
    (a) displaying control screens on a display screen of a display unit, each of said control screens including at least one of a control data selection area and an operating condition display area corresponding to a control device to be controlled for process control operation;

(b) performing an input instruction operation to select control data in the control data selection area on a particular control screen; and (c) operating a switch corresponding to the particular control screen after confirming that the control data has been accurately selected, said switch belonging to a group from among groups of switches disposed outside of the display screen with each of the groups uniquely corresponding to a separate control screen and;

(d) actuating the control device to be controlled only after steps (a) through (c).

10. A method according to claim 9, wherein the confirming that the control data has been accurately selected is performed by changing a display condition of the control data selection area.

11. A method according to claim 10, wherein step (b) is effected by a touch operation of the display screen.

12. A method according to claim 10, wherein step (b) is effected by a light pen.

13. A method according to claim 12, wherein step (b) is effected by a mouse.

14. A method according to claim 10, wherein step (b) is effected by a mouse.

15. A method according to claim 9, wherein step (b) is effected by a touch operation on the display screen.

16. A method according to claim 9, wherein step (b) is effected by a light pen.

17. A process monitoring and displaying system comprising:

means for displaying a system diagram with diagrams of control devices for process control on a display screen of a display unit;

input means for performing an input instruction operation for selection of a particular control device;

a control screen of a predetermined size including at least one of a control data selection area and an operating condition display area corresponding to the particular control device;

display position decision means for comparing a coordinate of a display position of the control screen with a coordinate of the selected control device and determining a display position of the control screen where the control screen is not superimposed on the selected control device; and means for displaying the control screen in combination with the system diagram at the display position determined by the display position decision means.

18. A system according to claim 17, further comprising:

means for storing a coordinate of a predetermined area of the control screen as a movement request acceptance area for accepting a request for moving the control screen;

means for recognizing the request for moving the control screen upon input of an instruction requesting movement of the control screen to the movement request acceptance area;

means for determining a control screen destination position specified by an input instruction as a display screen destination of movement of the control screen and storing a coordinate of the specified position when operation of the input instruction for specifying the destination position of the control screen is performed on the display screen after the input of the instruction requesting the movement of the control screen; and means for moving the control screen to the display screen destination, redisplaying a part of the system diagram hidden behind the control screen before movement of the control screen and displaying a combined display screen including the control screen and the system diagram.

19. A system according to claim 18, wherein the control screen destination position is a position predetermined in accordance with a position of the control screen before the movement of the control screen.

20. A system according to claim 19, wherein the input means includes a touch sensor arranged on a display unit for generating a signal indicating a contact position in response to an operator coming into contact with the touch sensor.

21. A system according to claim 19, wherein the input means generates a signal indicating a contact position of a light pen on a display screen.

22. A system according to claim 18, wherein the input means includes a touch sensor arranged on a display unit for generating a signal indicating a contact position in response to an operator coming into contact with the touch sensor.

23. A system according to claim 18, wherein the input means generates a signal indicating a contact position of a light pen on a display screen.

24. A system according to claim 18, wherein the input means generates a signal indicating a position on a display screen designated by a mouse.

25. A system according to claim 19, wherein the input means generates a signal indicating a position on a display screen designated by a mouse.

26. A process monitoring and displaying system comprising:

means for displaying a system diagram with diagrams of control devices for process control on a display screen of a display unit;

input means for performing an input instruction operation for selecting a particular control device and for providing a control instruction;

a control screen of a predetermined size including at least one of a control data selection area and an operating condition display area corresponding to the selected control device; and means for displaying the control screen at a predetermined position on the display screen and displaying the system diagram in reduced form in a remaining display area of the display screen.

27. A system according to claim 26, further comprising:

means for calling a related-data screen or a second control screen by calling data related to control data being selected or by an input instruction operation for selection of a second particular control device in the system diagram displayed in reduced form when the control screen and the system diagram displayed in reduced form are being displayed in combination on the display screen;

means for displaying the related-data screen or the second control screen adjacent to the control screen; and means for displaying the system diagram displayed in reduced form in further reduced form in a remaining display area of the display screen.

28. A system according to claim 27, further comprising:

means for displaying the control screen or the related-data screen adjacent to the control screen or to a related-data screen being displayed when selective operation of a control device or calling the related-data screen is repeated;

means for displaying the system diagram displayed in further reduced form in a still further reduced form in a remaining display screen area; and means for displaying in scroll all of the control screens and the related-data screen called, a reduction rate of the system diagram being set to a predetermined value when a predetermined value of the reduction rate is exceeded by a reduction of the system diagram.

29. A system according to claim 28, wherein the related-data screen is adapted to display at least one of a condition display screen for the selected control device, an additional control data display screen, a trend screen and a related system diagram.

30. A system according to claim 28, wherein the input means includes a touch sensor arranged on a display unit for generating a signal indicating a contact position in response to an operator coming into contact with the touch sensor.

31. A system according to claim 28, wherein the input means generates a signal indicating a contact position of a light pen on a display screen.

32. A system according to claim 28, wherein the input means generates a signal indicating a position on a display screen designated by a mouse.

33. A system according to claim 27, wherein the related-data screen is adapted to display at least one of a condition display screen for the selected control device, an additional control data display screen, a trend screen and a related system diagram.

34. A system according to claim 27, wherein the input means includes a touch sensor arranged on a display unit for generating a signal indicating a contact position in response to an operator coming in contact with the touch sensor.

35. A system according to claim 27, wherein the input means generates a signal indicating a contact position of a light pen on a display screen.

36. A system according to claim 27, wherein the input means generates a signal indicating a position on a display screen designated by a mouse.

37. A system according to claim 26, wherein the input means includes a touch sensor arranged on a display unit for generating a signal indicating a contact position in response to an operator coming into contact with the touch sensor.

38. A system according to claim 26, wherein the input means generates a signal indicating a contact position of a light pen on a display screen.

39. A system according to claim 26, wherein the input means generates a signal indicating a position on a display screen designated by a mouse.

40. A method of process monitoring and displaying comprising the steps of:
 (a) displaying a system diagram with diagrams of control devices having specific control functions for process control on a display screen of a display unit;
 (b) displaying on the display screen a first control screen of a predetermined size for displaying at least one of control data and an operating condition of a first control device selected by an input of the first control device;
 (c) displaying the system diagram in reduced form in combination with the first control screen in a remaining display screen area;
 (d) displaying a first data screen or a second control screen of a second control device as a control-related screen adjacent to the first control screen by input of the second control device, which is to be controlled, or by calling of the first data screen, the first data screen being related to the operation of the first control device;
 (e) displaying the system diagram in a further reduced form in combination with the control-related screen in a part of a display screen area remaining after displaying of the control-related screen;
 (f) repeating the steps (d) and (e) to call a new control-related screen with each repetition of steps (d) and (e), the new control-related screen being displayed adjacent to a control-related screen already called, the system diagram being displayed in combination with a control-related screen in further reduced form in a remaining display screen area; and
 (g) setting the system diagram to a predetermined reduction rate and displaying all the control-related screens in scroll when the predetermined reduction rate is exceeded by a reduction of the system diagram.

41. A method of process monitoring and displaying according to claim 40, wherein application of a control device is effected by a touch operation on the display screen.

42. A method of process monitoring and displaying according to claim 40, wherein application of a control device is effected by a light pen contacting the display screen.

43. A method of process monitoring and displaying according to claim 40, wherein application of a control device is effected by a mouse.

* * * * *